(12) United States Patent
Balasubramanian

(10) Patent No.: US 12,244,584 B1
(45) Date of Patent: Mar. 4, 2025

(54) SYSTEM AND METHOD FOR PERFORMING TASKS BY PROVIDING A DECENTRALIZED COMMUNICATION BETWEEN ENTITIES

(71) Applicant: UnifyGPT Inc, Santa Ana, CA (US)

(72) Inventor: Raghuram Balasubramanian, Santa Ana, CA (US)

(73) Assignee: UnifyGPT Inc, Santa Ana, CA (US)

( * ) Notice: Subject to any disclaimer, the term of this patent is extended or adjusted under 35 U.S.C. 154(b) by 0 days.

(21) Appl. No.: 18/764,190

(22) Filed: Jul. 4, 2024

(51) Int. Cl.
*H04L 9/40* (2022.01)
*G06Q 20/12* (2012.01)
*G06Q 20/36* (2012.01)
*G06Q 20/38* (2012.01)
*H04L 9/32* (2006.01)

(52) U.S. Cl.
CPC ............ *H04L 63/083* (2013.01); *H04L 63/08* (2013.01); *H04L 63/12* (2013.01); *G06Q 20/123* (2013.01); *G06Q 20/36* (2013.01); *G06Q 20/3821* (2013.01); *H04L 9/32* (2013.01)

(58) Field of Classification Search
CPC ......... H04L 9/32; H04L 63/08; H04L 63/083; H04L 63/12; G06Q 20/123; G06Q 20/36; G06Q 20/3821
See application file for complete search history.

(56) References Cited

U.S. PATENT DOCUMENTS

| | | | |
|---|---|---|---|
| 10,594,840 B1 | 3/2020 | Darby et al. | |
| 11,107,141 B1* | 8/2021 | Nagarajappa | G06Q 30/0617 |
| 11,146,598 B1 | 10/2021 | Palihakkara et al. | |
| 11,431,503 B2 | 8/2022 | Perpetua, Jr. et al. | |
| 12,093,928 B2* | 9/2024 | Kahn | G06Q 20/02 |
| 2018/0349206 A1* | 12/2018 | Erickson | G06F 40/216 |

(Continued)

OTHER PUBLICATIONS

"Discovering Synergy Between Artificial Intelligence & NFT"—Nikhil Khandelwal VLink, Jul. 24, 2023 https://vlinkinfo.com/blog/discovering-synergy-between-artificial-intelligence-ai-and-nft/ (Year: 2023).*

(Continued)

*Primary Examiner* — Randy A Scott
(74) *Attorney, Agent, or Firm* — Jason C. Cameron

(57) ABSTRACT

A system and method for performing tasks by providing decentralized communication between entities are disclosed. The system is a computer-implemented system comprised of a plurality of subsystems. The plurality of subsystems comprises an identity managing subsystem, an entity detection subsystem, a first data-exchange subsystem, an entity selection subsystem, and a second data-exchange subsystem. The system is configured to manage one or more unique digital identities for each entity of the at least two entities associated with the computer-implemented system based on registration and authentication of each entity on a decentralized network. The system is configured to enable a first entity associated with the at least two entities to detect one or more second entities for exchanging generic communication data and domain-specific communication data for performing the one or more tasks by providing the decentralized communication between the at least two entities.

18 Claims, 12 Drawing Sheets

(56) References Cited

U.S. PATENT DOCUMENTS

2023/0351353 A1* 11/2023 Saraf ............... G06Q 30/0613
2024/0202849 A1* 6/2024 Kawaguchi ......... G06Q 50/184

OTHER PUBLICATIONS

"How Are NFTs Related to AI?"—Rodrigo Cabello, Plain Concepts Research, Mar. 22, 2022 https://www.plainconcepts.com/nfts-artificial-intelligence/ (Year: 2022).*
https://www.dappros.com/202308/web3-chat-bots-framework/; Taras FilatovTaras FilatovAug. 17, 2023Build a Web3 Social App, Ethora; Web3 Chat Bots framework.
https://learn.microsoft.com/en-us/azure/bot-service/rest-api/bot-framework-rest-connector-authentication?view=azure-bot-service-4.0&tabs=multitenant; Article Feb. 10, 2023 13 contributors; Authentication with the Bot Connector API.
https://dspace.library.uu.nl/bitstream/handle/1874/4244457Eur_J_of_Neuroscience_2022_Hogenhuis_Domain_specific_and_domain_general_neural_network_engagement_during_human_robot.pdf?sequence=1&isAllowed=y; Received: Nov. 29, 2021 Accepted: Aug. 3, 2022Domain-specific and domain-general neural network engagement during human-robot interactions.

* cited by examiner

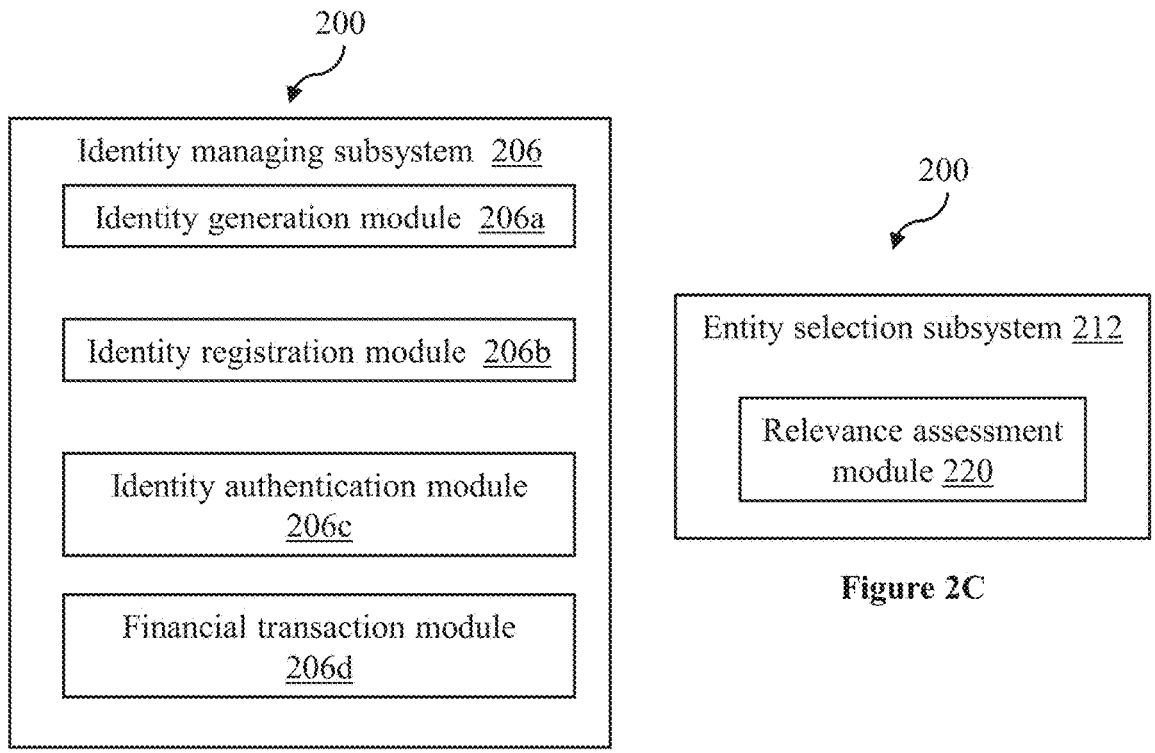
Figure 2B
Figure 2C
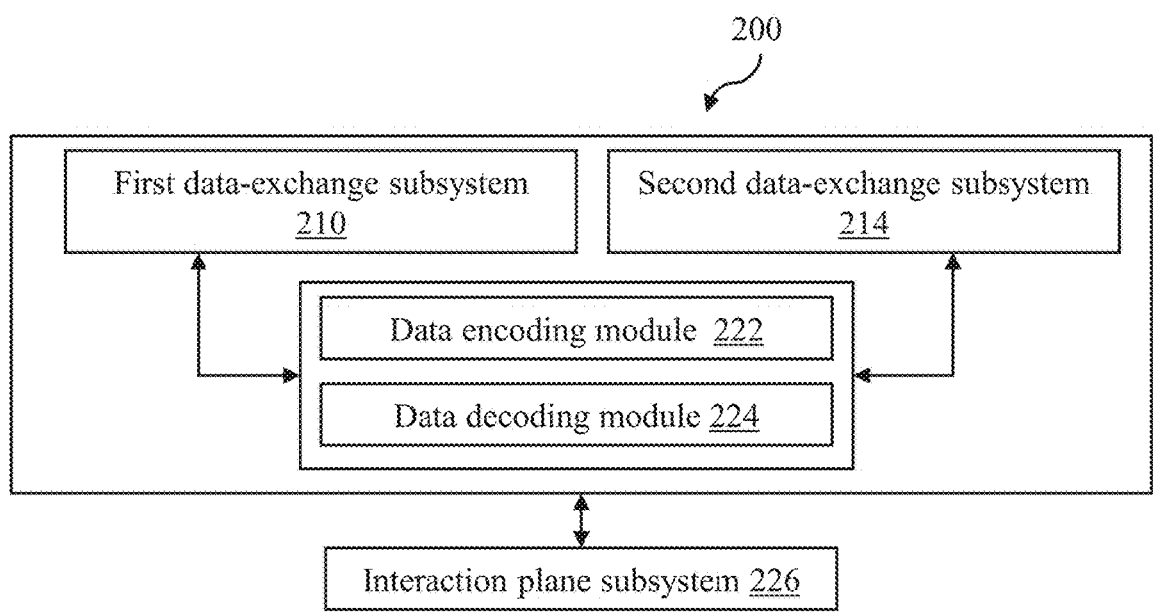
Figure 2D

SYSTEM AND METHOD FOR PERFORMING TASKS BY PROVIDING A DECENTRALIZED COMMUNICATION BETWEEN ENTITIES

TECHNICAL FIELD

Embodiments of the present disclosure relate to decentralized communication and more particularly relate to a computer-implemented system for performing one or more tasks by providing a decentralized communication between at least two entities.

BACKGROUND

In rapidly advancing autonomous systems, a necessity for streamlined communication and interaction protocols has emerged as a pressing concern. Presently, many existing technologies lean on decentralized communication that facilitates seamless interaction between various entities in both digital and physical environments. Traditional centralized communication systems have limitations in scalability, security, and privacy, leading to inefficiencies and vulnerabilities in data transmission.

Existing technologies often rely on one of: centralized servers and intermediaries to manage communication channels, resulting in single points of failure and potential security risks. Additionally, conventional communication protocols lack adequately address diverse needs of modern applications, such as real-time data exchange, interoperability, and privacy protection.

Moreover, in many centralized communication systems, establishing trust between entities is challenging, especially in scenarios involving one of: sensitive information and financial transactions. Compounding these issues is a reliance on conventional methods for authentication and discovery, typified by lengthy hexadecimal ID strings and labor-intensive registration procedures. Conventional methods often lack scalability and efficiency, leading to increased complexity and overhead in managing identities and establishing trust between entities. As a result, the risk of impersonation, data breaches, and unauthorized access to confidential data is further exacerbated, posing significant challenges in ensuring the security and integrity of communication channels.

Furthermore, current communication systems lack an adaptability and intelligence to optimize communication processes dynamically. As a result, users may experience delays, bottlenecks, and suboptimal resource utilization, particularly in complex environments with multiple interacting entities.

In the existing technology, a method for establishing and conducting a transaction in a bot-to-bot communication session is disclosed. Initially, a request for the transaction is received, specifying the involvement of a user bot and a service bot in the communication session. To ensure the integrity of the transaction, a trust relationship is established between the user bot and the service bot. Communication attributes, trust attributes, and functional attributes pertinent to the communication session are identified and stored using a distributed data store designed for managing a bot identity. The communication attributes, trust attributes, and functional attributes are then transmitted to both the user bot and the service bot. Subsequently, negotiation of communication prerequisites takes place, including the determination of security requirements based on the trust attributes. Finally, the bot-to-bot communication session proceeds, facilitated by the established communication attributes, trust attributes, and functional attributes. Nevertheless, the reliance on transmitting and storing the communication attributes, trust attributes, and functional attributes using the distributed data store may introduce security vulnerabilities. The distributed data store is susceptible to data breaches and unauthorized access, posing risks to the confidentiality and integrity of the bot-to-bot communication session.

There are various technical problems with the existing technologies in the prior art. In the existing technology, the decentralized communication between entities faces several technical challenges. One significant issue is the lack of efficient identity management mechanisms, leading to difficulties in establishing trust and ensuring the integrity of communication channels. Additionally, conventional methods for entity detection and authentication often rely on cumbersome processes and lengthy hexadecimal ID strings, resulting in reduced scalability and increased complexity. These shortcomings hinder the seamless exchange of data and hinder the adoption of decentralized communication systems in various applications, including financial transactions, data sharing, and collaborative environments.

Therefore, there is a need for a system to address the aforementioned issues by providing decentralized communication offers streamlined identity management, seamless entity detection, and authentication processes while ensuring the security and integrity of communication channels.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented system for performing one or more tasks by providing a decentralized communication between at least two entities is disclosed.

In an embodiment, the computer-implemented system comprises one or more hardware processors and a memory unit. The memory unit is coupled to the one or more hardware processors. The memory unit comprises a plurality of subsystems in form of programmable instructions executable by the one or more hardware processors. The plurality of subsystems comprises an identity managing subsystem, an entity detection subsystem, a first data-exchange subsystem, an entity selection subsystem, and a second data-exchange subsystem.

In an embodiment, the identity managing subsystem is configured to manage one or more unique digital identities for each entity of the at least two entities associated with the computer-implemented system based on a registration and authentication of each entity on a decentralized network. The identity managing subsystem comprises an identity generation module, an identity registration module, and an identity authentication module. The identity generation module is configured to generate one or more non-fungible tokens (NFTs) as the one or more unique digital identities for each entity of the at least two entities based on mnemonic identifiers. The mnemonic identifiers are obtained through at least one of a: participative social Web (Web2) name registrar and read, write, execute Web (Web3) name registrar. The identity registration module is configured to register the generated one or more NFTs onto the decentralized network for assigning each entity a unique identifier within the decentralized network. The decentralized network comprises at least one of: Ethereum, Binance Smart Chain (BSC), Flow, Tezos, and Polygon. The identity authentication module is configured to authenticate the registered one or more NFTs of each entity during the communication to provide an integrity and security in the decentralized communication.

In another embodiment, the identity managing subsystem is configured with a financial transaction module. The financial transaction module is configured to transfer digital assets between the at least two entities within the decentralized network based on domain-specific communication data. The digital assets comprise at least one of: cryptocurrency, stablecoins, fungible tokens, and the one or more non-fungible tokens (NFTs). The financial transaction module is configured to validate and store financial transaction data in a database.

Yet another embodiment, the entity detection subsystem is configured to enable a first entity associated with the at least two entities to detect one or more second entities associated with the at least two entities within a pre-defined distance in the decentralized network by employing a communication network, based on the one or more unique digital identities. The detection of the one or more second entities is performed based on at least one of: broadcasting, multicasting, service discovery protocols, beaconing, transmission control protocol (TCP), directory access services, probing, polling, peer-to-peer networking, entity-based detection, and application programming interface (API)-based detection In an embodiment, the first data-exchange subsystem is configured to exchange generic communication data between the first entity and the one or more second entities using one or more bidirectional communications in a generative artificial intelligence (AI) environment for the one or more tasks. The first data-exchange subsystem is configured to connect with the identity authentication module to authenticate the generic communication data. The generic communication data comprises at least one the: one or more unique digital identities, historic communication data, metadata related to communication sessions, and cryptographic signatures.

In an exemplary embodiment, the first entity is configured with a first unique digital identity of the one or more unique digital identities. The first unique digital identity comprises the generic communication data to exchange with the one or more second entities through the first data-exchange subsystem. The first unique digital identity comprises one or more second unique digital identities. The one or more second unique digital identities comprises the domain-specific communication data to exchange with the one or more second entities through the second data-exchange subsystem.

In another embodiment, the generative AI environment comprises at least one of a: machine learning module, and natural language processing module. The machine learning module is configured with one or more large language models (LLMs) to analyze communication patterns and optimize communication strategies based on the historic communication data. The natural language processing module is configured to process and generate anthropomorphic responses during the decentralized communication between the at least two entities.

Yet another embodiment, the entity selection subsystem is configured to select the one or more second entities based on the one or more bidirectional communication between the first entity and the one or more second entities in the generative AI environment for the one or more tasks. The entity selection subsystem is configured with a relevance assessment module. The relevance assessment module is configured to assess a relevance score of the one or more second entities based on one or more predetermined conditions. The one or more predetermined conditions comprises at least one of: proximity, compatibility, availability, and historic communications data.

In an embodiment, the second data-exchange subsystem is configured to exchange the domain-specific communication data between the first entity and the one or more second entities for performing the one or more tasks by providing the decentralized communication between the at least two entities. The first data-exchange subsystem and the second data-exchange subsystem comprises a data encoding module and a data decoding module. The data encoding module is configured to encode the generic communication data and the domain-specific communication data based on standardized protocols. The standardized protocols comprise at least one of: Hypertext Transfer Protocol (HTTP), Transmission Control Protocol (TCP), Internet Protocol (IP), JavaScript Object Notation (JSON), and Extensible Markup Language (XML). The decoding module is configured to decode the generic communication data and the domain-specific communication data during the decentralized communication between the at least two entities.

In another embodiment, each of the first data-exchange subsystem and the second data-exchange subsystem are configured to connect with an interaction plane subsystem. The interaction plane subsystem is configured to manage the decentralized communication between the at least two entities through one of a: virtual interaction platform and physical interaction platform. The virtual interaction platform is configured to exchange the generic communication data and the domain-specific communication data in digital environments. The digital environments include one of: websites, applications, and messaging platforms. The physical interaction platform is configured to exchange the generic communication data and the domain-specific communication data in a real world. The real world includes one of: locations in physical space and proximity-based interactions. The domain-specific communication data comprises at least one of: financial transaction data, instructions associated with an autonomous transaction execution, session management data, time tracking data, namespace management data, subscription management data, logging data, reporting data, analytics data, electronic commerce management data, and bot queuing data.

Yet another embodiment, the decentralized communication between the at least two entities comprises one of a: bot-to-bot communication, human-to-bot communication, autonomous engine-to-bot communication, autonomous engine-to-autonomous engine communication, and autonomous engine-to-human communication. In another exemplary embodiment, the communication network comprises at least one of a: long-range wireless broadband communication network and short-range communication network. The long-range wireless broadband communication network comprises at least one of: Long-Term Evolution (LTE), Fifth Generation (5G), Worldwide Interoperability for Microwave Access (WiMAX), Satellite Internet, Fixed Wireless Access (FWA), and High-Altitude Platform Stations (HAPS). The long-range wireless broadband communication network is configured to establish the decentralized communication between the at least two entities within the pre-defined distance for exchanging the generic communication data. The short-range communication network comprises at least one of: Bluetooth Low Energy (BLE), Wireless Fidelity (Wi-Fi) Direct, Near Field Communication (NFC), Zigbee, Z-Wave, and thread. The short-range communication network is configured to establish the decentralized communication between the at least two entities upon selecting the one or more second entities for exchanging the domain-specific communication data.

In accordance with an embodiment of the present disclosure, the computer-implemented method for performing the one or more tasks by providing the decentralized communication between the at least two entities is disclosed. In first step, the computer-implemented method includes managing, by the one or more hardware processors, the one or more unique digital identities for each entity of the at least two entities associated with the computer-implemented system based on the registration and the authentication of each entity on the decentralized network.

In the next step, the computer-implemented method includes enabling, by the one or more hardware processors, the first entity associated with the at least two entities to detect the one or more second entities associated with the at least two entities within the pre-defined distance in the decentralized network through the communication network based on the one or more unique digital identities.

In the next step, the computer-implemented method includes exchanging, by the one or more hardware processors, the generic communication data between the first entity and the one or more second entities using the one or more bidirectional communications in the generative AI environment for the one or more tasks. In the next step, the computer-implemented method includes selecting, by the one or more hardware processors, the one or more second entities based on the one or more bidirectional communication between the first entity and the one or more second entities in the generative AI environment for the one or more tasks.

In the next step, the computer-implemented method includes exchanging, by the one or more hardware processors, the domain-specific communication data between the first entity and the one or more second entities to perform the one or more tasks by providing the decentralized communication between the at least two entities. The domain-specific communication data comprises at least one of the: financial transaction data, instructions associated with an autonomous transaction execution, session management data, time tracking data, namespace management data, subscription management data, logging data, reporting data, analytics data, electronic commerce management data, and bot queuing data.

In another embodiment of the present disclosure, a non-transitory computer-readable storage medium having programmable instructions stored therein, that when executed by the one or more hardware processors, cause the one or more hardware processors to: a) managing the one or more unique digital identities for each entity of the at least two entities associated with the computer-implemented system based on the registration and the authentication of each entity on the decentralized network, b) enabling the first entity associated with the at least two entities to detect the one or more second entities associated with the at least two entities within the pre-defined distance in the decentralized network through the communication network based on the one or more unique digital identities, c) exchanging the generic communication data between the first entity and the one or more second entities using the one or more bidirectional communications in the generative AI environment for the one or more tasks, d) selecting the one or more second entities based on the one or more bidirectional communication between the first entity and the one or more second entities in the generative AI environment for the one or more tasks, and e) exchanging the domain-specific communication data between the first entity and the one or more second entities to perform the one or more tasks by providing the decentralized communication between the at least two entities.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIGS. 2A-2E illustrate exemplary blocks diagram representation of the computer-implemented system as shown in FIG. 1 for performing one or more tasks by providing a decentralized communication between the at least two entities, in accordance with an embodiment of the present disclosure;

Figure 1:
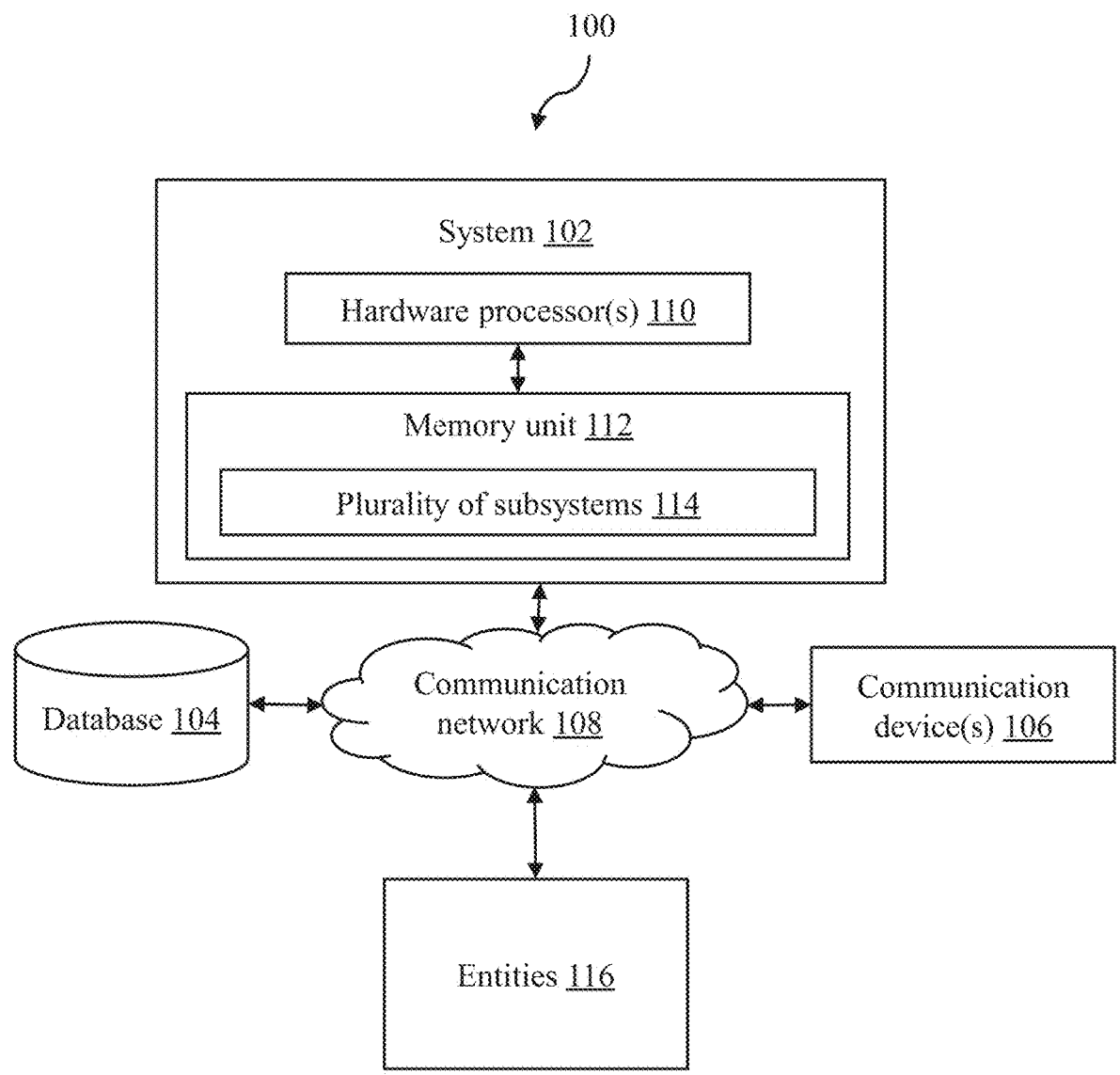
FIG. 1 illustrates an exemplary block diagram representation of a network architecture of a computer-implemented system for performing one or more tasks by providing a decentralized communication between at least two entities, in accordance with an embodiment of the present disclosure.
Figure 2A:
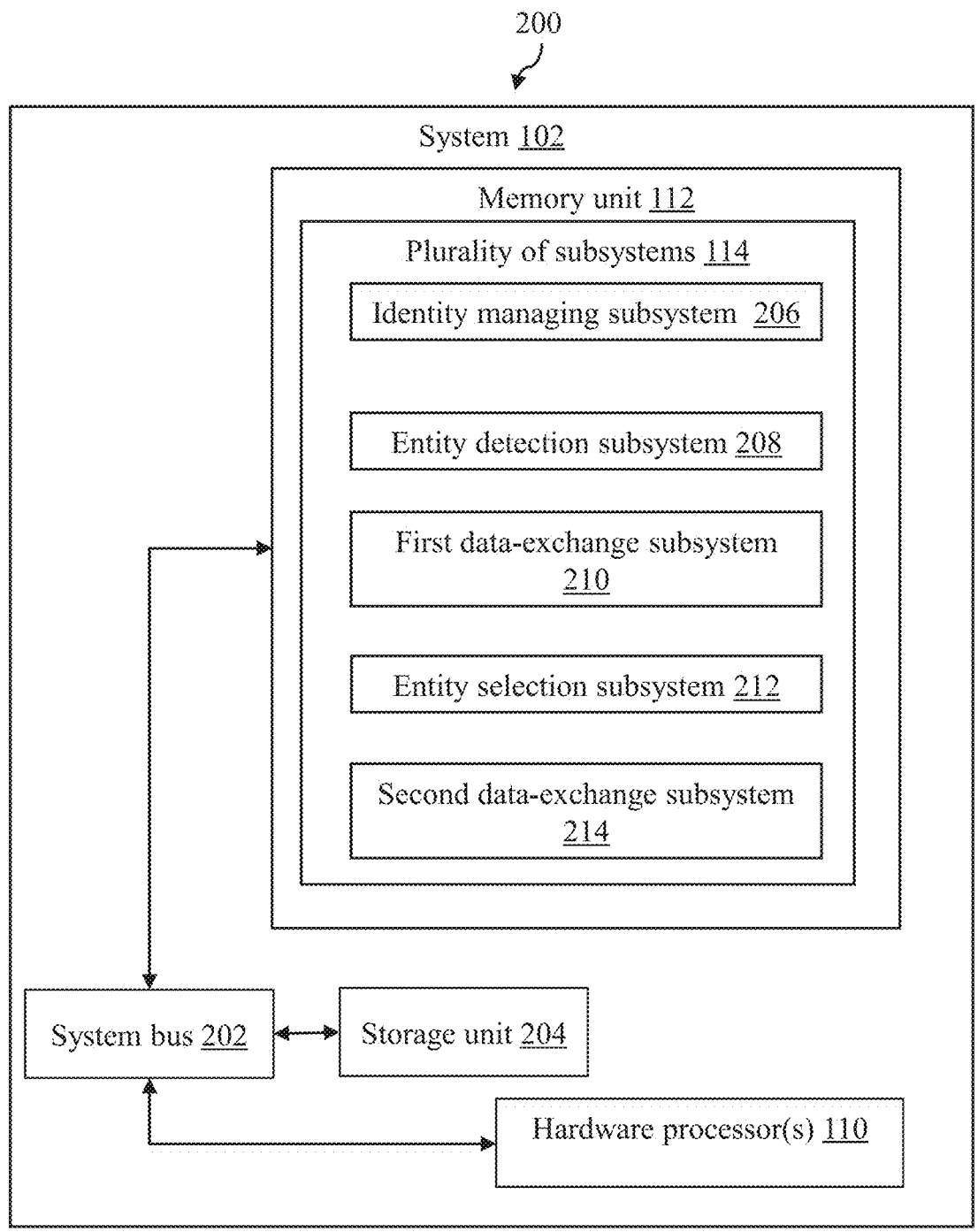
Figure 2E:
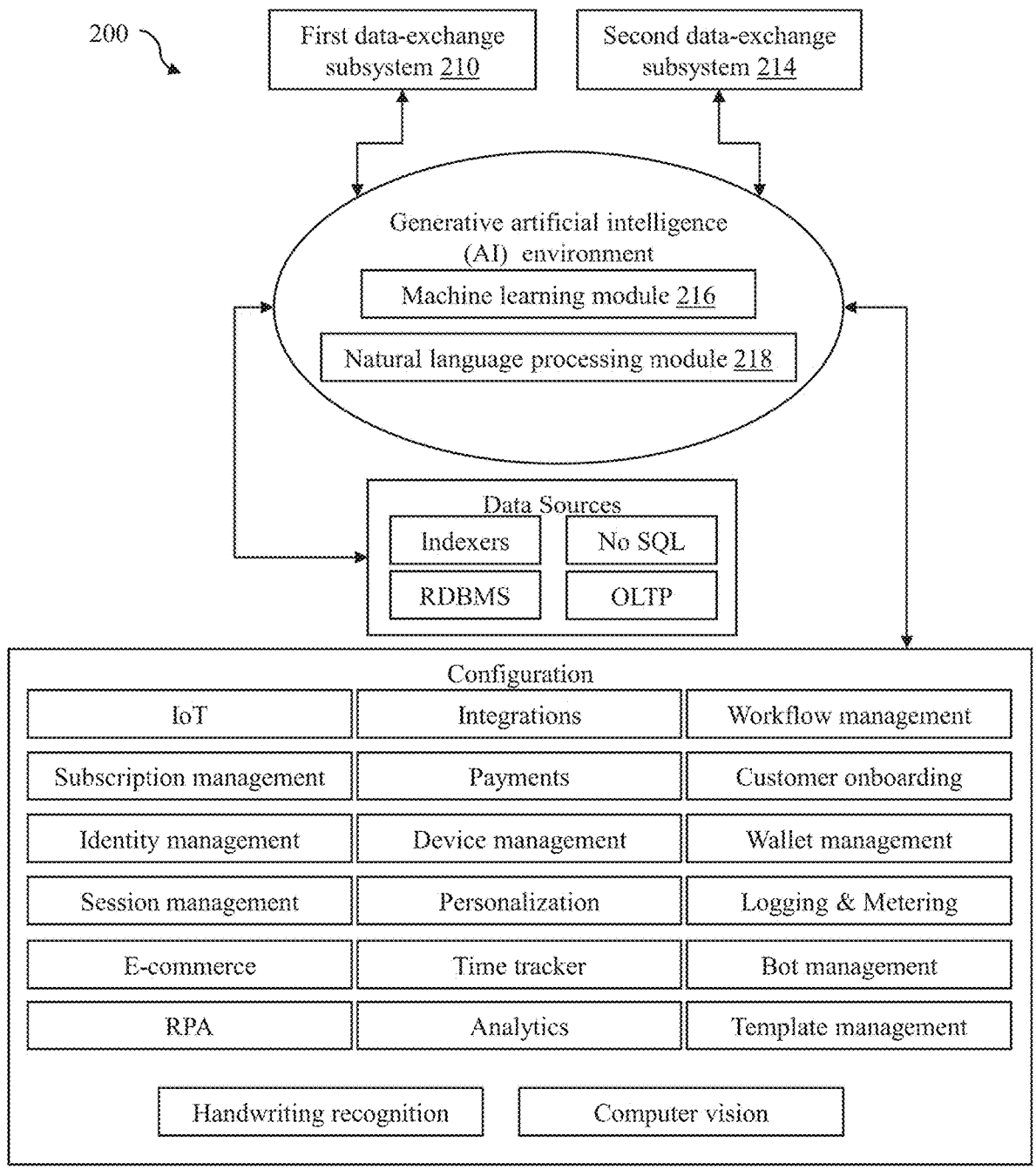

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 8, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 of a computer-implemented system 102 for performing one or more tasks by providing a decentralized communication between at least two entities 116, in accordance with an embodiment of the present disclosure.

According to an exemplary embodiment of the present disclosure, FIG. 1 depicts the network architecture 100 that may include the computer-implemented system 102, a database 104, and one or more communication devices 106. The computer-implemented system 102 may be communicatively coupled to the database 104, and the one or more communication devices 106 via a communication network 108. The communication network 108 may be a wired communication network and/or a wireless communication network. In another exemplary embodiment, the communication network 108 comprises at least one of a: long-range wireless broadband communication network and short-range communication network. The long-range wireless broadband communication network comprises at least one of: Long-Term Evolution (LTE), Fifth Generation (5G), Worldwide Interoperability for Microwave Access (WiMAX), Satellite Internet, Fixed Wireless Access (FWA), and High-Altitude Platform Stations (HAPS). The long-range wireless broadband communication network is configured to establish the decentralized communication between the at least two entities 116 within the pre-defined distance for exchanging generic communication data. The short-range communication network comprises at least one of: Bluetooth Low Energy (BLE), Wireless Fidelity (Wi-Fi) Direct, Near Field Communication (NFC), Zigbee, Z-Wave, and thread. The short-range communication network is configured to establish the decentralized communication between the at least two entities 116 upon selecting one or more second entities for exchanging domain-specific communication data.

The database 104 may include, but not limited to, storing, and managing data related to entity identities, communication logs, transaction records, system configurations and the like. The computer-implemented system 102 facilitates decentralized communication between entities by managing identity generation, registration, and authentication processes. The database 104 may be any kind of database such as, but not limited to, relational databases, non-relational databases, graph databases, document databases, dedicated databases, dynamic databases, monetized databases, scalable databases, cloud databases, distributed databases, any other databases, and a combination thereof. The database 104 is configured to support the functionality of the computer-implemented system 102 and enables efficient data retrieval and storage for performing the one or more tasks by providing the decentralized communication between the at least two entities 116.

In an exemplary embodiment, the one or more communication devices 106 may be associated with the at least two entities 116. The at least two entities 116 may comprises, but not limited to, one or more service providers, one or more customers, an individual, an administrator, a vendor, a technician, a worker, a specialist, an instructor, a supervisor, a team, an organization, a company, a facility, a bot, any other user, and combination thereof. The at least two entities 116, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

The one or more communication devices 106 may be used to provide input and/or receive output to/from the computer-implemented system 102, and/or to the database 104, respectively. The one or more communication devices 106 may be configured with one or more user interfaces to interact with the computer-implemented system 102 and/or to the database 104 for performing the one or more tasks by providing the decentralized communication between the at least two entities 116. The one or more communication devices 106 may be at least one of, an electrical, an electronic, an electromechanical, and a computing device. The one or more communication devices 106 may include, but is not limited to, a mobile device, a smartphone, a personal digital assistant (PDA), a tablet computer, a phablet computer, a wearable computing device, a virtual reality/augmented reality (VR/AR) device, a laptop, a desktop, and the like.

Further, the computer-implemented system 102 may be implemented by way of a single device or a combination of multiple devices that may be operatively connected or networked together. The computer-implemented system 102 may be implemented in hardware or a suitable combination of hardware and software. The computer-implemented system 102 includes one or more hardware processors 110, and a memory unit 112. The memory unit 112 may include a plurality of subsystems 114. The computer-implemented system 102 may be a hardware device including the one or more hardware processors 110 executing machine-readable program instructions for dynamically recommending course of action sequences within the decentralized communication between the at least two entities 116. Execution of the machine-readable program instructions by the one or more hardware processors 110 may enable the computer-implemented system 102 to dynamically recommend course of action sequence within the decentralized communication between the at least two entities 116. The course of action sequences may involve various steps or decisions taken within a decentralized network to optimize the user experience, streamline transactions, and ensure efficient interactions between the at least two entities 116 involved in the decentralized communication. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory unit 112 operationally coupled with the computer-implemented system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases 104, network attached storage devices, servers, assets, machinery, instruments, facility equipment, emergency management devices, image capturing devices, any other devices, and combination thereof. The person skilled in the art should not be limiting the components/subsystems shown in FIG. 1. Although FIG. 1 illustrates the computer-implemented system 102, and the one or more communication devices 106 connected to the database 104, one skilled in the art can envision that the computer-implemented system 102, and the one or more communication devices 106 may be connected to several user devices located at various locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 102 as is unique to the present disclosure or necessary for an understanding of the present disclosure is depicted and described. The remainder of the construction and operation of the computer-implemented system 102 may conform to any of the various current implementations and practices that were known in the art.

In an exemplary embodiment, the computer-implemented system 102 may manage one or more unique digital identities for each entity of the at least two entities 116 associated with the computer-implemented system 102 based on a registration and authentication of each entity on the decentralized network. In an exemplary embodiment, the computer-implemented system 102 may enable a first entity associated with the at least two entities 116 to detect the one or more second entities associated with the at least two entities 116 within the pre-defined distance in the decentralized network by employing the communication network 108, based on the one or more unique digital identities.

In an exemplary embodiment, the computer-implemented system 102 may exchange the generic communication data between the first entity and the one or more second entities using one or more bidirectional communications in a generative artificial intelligence (AI) environment for the one or more tasks. In an exemplary embodiment, the computer-implemented system 102 may select the one or more second entities based on the one or more bidirectional communication between the first entity and the one or more second entities in the generative artificial intelligence (AI) environment for the one or more tasks. In an exemplary embodiment, the computer-implemented system 102 may exchange the domain-specific communication data between the first entity and the one or more second entities for performing the one or more tasks by providing the decentralized communication between the at least two entities 116.

FIGS. 2A-2E illustrate exemplary block diagrams 200 representation of the computer-implemented system as shown in FIG. 1 for performing one or more tasks by providing a decentralized communication between the at least two entities, in accordance with an embodiment of the present disclosure.

In an exemplary embodiment, the computer-implemented system 102 (hereinafter referred to as the system 102) comprises the one or more hardware processors 110, the memory unit 112, and a storage unit 204. The one or more hardware processors 110, the memory unit 112, and the storage unit 204 are communicatively coupled through a system bus 202 or any similar mechanism. The memory unit 112 comprises the plurality of subsystems 114 in the form of programmable instructions executable by the one or more hardware processors 110. In an exemplary embodiment, the plurality of subsystems 114 comprises an identity managing subsystem 206, an entity detection subsystem 208, a first data-exchange subsystem 210, an entity selection subsystem 212, and a second data-exchange subsystem 214.

The one or more hardware processors 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory unit 112 may be a non-transitory volatile memory and a non-volatile memory. The memory unit 112 may be coupled to communicate with the one or more hardware processors 110, such as being a computer-readable storage medium. The one or more hardware processors 110 may execute machine-readable instructions and/or source code stored in the memory unit 112. A variety of machine-readable instructions may be stored in and accessed from the memory unit 112. The memory unit 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, solid state drives, and the like. In the present embodiment, the memory unit 112 includes the plurality of subsystems 114 stored in the form of machine-readable instructions on any of the above-mentioned storage media and may be in communication with and executed by the one or more hardware processors 110.

The storage unit 204 may be a cloud storage or the database such as those shown in FIG. 1. The storage unit 204 may store, but is not limited to, recommending a course of action sequences, historical communication data, entity identities, display name of the at least two entities 116, system configurations, short textual description, Global Positioning system (GPS) coordinates of the at least two entities 116, and a list of parameters corresponding to application context, generated recommending course of action sequences, one or more clickable elements, completion status of initiated user action through recommended course of action sequences, feedback loops, feedback from users, query parameters, additional query parameters, deep integration parameters, up-sell/x-sell product links, tracked user click-through rates, any other data, and combinations thereof. By leveraging the storage unit 204 like cloud-based platforms or dedicated databases, the system 102 ensures efficient retrieval and management of essential information, supporting robust functionality and seamless operation. The storage unit 204 may be any kind of the database such as, but are not limited to, relational databases, dedicated databases, dynamic databases, monetized databases, scalable databases, cloud databases, distributed databases, any other databases, and a combination thereof.

In an exemplary embodiment, the identity managing subsystem 206 is configured to manage the one or more unique digital identities for each entity 116 of the at least two entities 116 associated with the system 102. The one or more unique digital identities is managed based on the registration and authentication of each entity 116 on the decentralized network. The identity managing subsystem 206 comprises an identity generation module 206a, an identity registration module 206b, and an identity authentication module 206c.

In an exemplary embodiment, the identity generation module 206a within the identity managing subsystem 206 is configured to generate the distinctive one or more unique digital identities for each entity 116 of the at least two entities 116. The one or more unique digital identities is generated in the form of one or more non-fungible tokens (NFTs) which serves as a unique identifier for each entity 116 within the system 102. The process of generating these one or more NFTs relies on mnemonic identifiers, which are derived from mnemonic phrases or memorable words associated with each entity 116. These mnemonic identifiers are sourced from at least one of a: participative social Web (Web2) name registrar and read, write, execute Web (Web3) name registrar, which facilitate the creation and management of digital identities. The Web2 name registrar allows the at least two entities 116 to interact and contribute to the generation of mnemonic identifiers in a participative generative artificial intelligence (AI) environment. Conversely, the Web3 registrar provides functionality for reading, writing, and executing operations related to mnemonic identifiers within a decentralized Web3 ecosystem. By leveraging these name registrar platforms, the system 102 ensures the creation of robust and distinguishable digital identities for each entity 116, thereby enhancing security and enabling seamless interaction within the system 102.

In an exemplary embodiment, the identity registration module 206b is configured to register the generated one or more NFTs onto the decentralized network, thereby assigning the unique identifier to each entity 116 within the decentralized network. The decentralized network comprises at least one of, but not limited to, Ethereum, Binance Smart Chain (BSC), Flow, Tezos, Polygon, and the like. By leveraging the capabilities of these decentralized networks, each entity 116 is endowed with a distinct identity, ensuring secure and tamper-proof authentication and communication within the system 102.

In an exemplary embodiment, the identity authentication module 206c is configured to authenticate the registered one or more NFTs of each entity 116 during the communication for providing integrity and security in the decentralized communication. By validating the one or more NFTs of participating entities 116, the system 102 maintains a trusted environment where interactions are safeguarded against unauthorized access or tampering, thereby fostering secure and reliable communication among the at least two entities 116. In the illustrative embodiment, the at least two entities 116 communications, payment histories, and token exchanges are recorded and managed on-chain using Polygon supernets solutions. This implementation ensures that a verifiable proof of authenticity is maintained for the at least two entities 116 communications and transactions. By leveraging Polygon supernets solutions, the system 102 benefits from enhanced security, scalability, and efficiency in managing and recording the at least two entities 116 interactions and financial transactions on the blockchain.

In an exemplary embodiment, the identity managing subsystem 206 is configured with a financial transaction module 206d. The financial transaction module 206d is configured to transfer digital assets between the at least two entities 116 within the decentralized network based on domain-specific communication data. The digital assets comprise at least one of, but not limited to, cryptocurrency, stablecoins, fungible tokens, the NFTs, and the like. By validating and securely storing financial transaction data in the database 104, the system 102 ensures the integrity and reliability of financial transactions conducted within the financial transaction module 206d. In the illustrative embodiment, each entity 116 of the at least two entities 116 adheres to the ERC6551 standard on the Ethereum blockchain. This standard facilitates the creation of NFTs that function as independent wallets, capable of holding various digital assets and executing smart contracts. Additionally, the at least two entities 116 expose scripts of actionable items through the ERC5169 standard, which encompasses predefined scripts designed to respond to specific categories of words to avoid, language-related scripts, and other pertinent instructions. These scripts are integrated into the functionality of the entities, allowing them to autonomously execute tasks and interact with other entities within the system 102 according to predefined parameters and criteria.

In an exemplary embodiment, the entity detection subsystem 208 is configured to enable a first entity associated with the at least two entities 116 to detect one or more second entities associated with the at least two entities 116. The entity detection subsystem 208 is configured to detect the one or more second entities associated with the at least two entities 116 within a pre-defined distance in the decentralized network by employing the communication network 108, based on the one or more unique digital identities. The entity detection subsystem 208 is configured to employ various communication protocols and technologies comprises, but not limited to, at least one of the: long-range wireless broadband communication network and short-range communication network. In an illustrative exemplary embodiment, the BLE allows the at least two entities 116 to broadcast advertising packets to nearby entities 116, facilitating proximity-based discovery. Additionally, Wi-Fi Direct may be employed for direct entity-to-entity connections without the need for a wireless access point. Moreover, the system 102 may utilize Narrowband Internet of Things (NBIOT) modules, such as the Wireless Simcom SIM7050C NBIOT Module, for low-latency and low-throughput data communication in diverse radio propagation conditions. These technologies enhance the accuracy and efficiency of entity detection within the decentralized network.

In an exemplary embodiment, the detection of the one or more second entities is performed based on at least one of, but not limited to, broadcasting, multicasting, service discovery protocols, beaconing, transmission control protocol (TCP), directory access services, probing, polling, peer-to-peer networking, entity-based detection, application programming interface (API)-based detection and the like. In an exemplary embodiment, the broadcasting includes if the first entity broadcasts a message that is received by the one or more second entities within the pre-defined distance. This allows the at least two entities 116 to send out general calls for connection, enabling any nearby entity capable of responding to initiate communication. Similar to broadcasting, multicasting involves the message addressed to a specific group of one or more second entities within the decentralized network. Only such one or more second entities that are part of the multicast group respond to the message, streamlining the connection process.

On the other hand, the service discovery protocols and a Bonjour protocol are utilized to discover services in the decentralized network. These service discovery protocols and the Bonjour protocol enable the at least two entities 116 to identify and connect with services offered by the one or more second entities on the decentralized network. In the beaconing, the first entities 116 emit signals or beacons to indicate their presence, allowing the one or more second entities seeking specific services or the one or more second entities to detect them and initiate the decentralized communication accordingly. The TCP method involves interactive communication, where the first entity sends a signal to the one or more second entities and waits for a response. A series of messages are then exchanged to establish a connection.

In the directory access services, the first entity registers their presence and offers services with a central directory, enabling the one or more second entities to query and discover required services or devices. A LDAP (Lightweight Directory Access Protocol) and a DNS (Domain Name System) are examples of directory services utilized for this purpose. In Probing or Polling: the first entity actively probes the network or polls the one or more second entities to determine their presence. This may involve simple ping requests or more complex queries, allowing the one or more second entities to identify and connect with the first entity. In peer-to-peer networks, the at least two entities 116 have equal roles and may dynamically discover each other using various methods such as flooding, where requests are sent to all peers until the target entity is found. In entity-based detection, some protocols employ an agent or mediator that possesses knowledge about the at least two entities 116 in the decentralized network. The at least two entities 116 communicate with this agent to discover each other, streamlining the discovery process. Further, in the application programming interface (API)-based detection, particularly relevant for software services in cloud environments, API endpoints serve as discovery points. Entities access known API endpoints to retrieve information about the at least two entities 116, facilitating seamless discovery and interaction.

In an exemplary embodiment, the first data-exchange subsystem 210 is configured to exchange generic communication data between the first entity and the one or more second entities within the decentralized network. In the illustrative embodiment, the first entity is configured with a first unique digital identity of the one or more unique digital identities. The first unique digital identity comprises the generic communication data to exchange with the one or more second entities through the first data-exchange subsystem 210. The first unique digital identity comprises one or more second unique digital identities. The one or more second unique digital identities comprises the domain-specific communication data to exchange with the one or more second entities through the second data-exchange subsystem. For example, if the first entity may be an autonomous engine and the one or more second entities may be at least one of a: parking meter, toll fee payment booth, package delivery agent. In this context, the autonomous engine registered with the first unique digital identity to exchange the generic communication data with at least one of the: parking meter, toll fee payment booth, package delivery agent. In the next step, the autonomous engine exchanges the domain-specific communication data by using the one or more second unique digital identities. The autonomous engine employs one or more second unique digital identities, tailored to the context of interaction, if the autonomous engine communicate with the parking meter it may use one type of second unique digital identity within the one or more second unique digital identities, similarly, when the autonomous engine communicates with the toll fee payment booth or package delivery agent it may use the another second unique digital identity within the one or more second unique digital identities.

The first data-exchange subsystem 210 is operated in the generative artificial intelligence (AI) environment, where one or more bidirectional communications enable seamless interaction between the first entity and the one or more second entities for the execution of tasks. The first data-exchange subsystem 210 is configured to connect with the identity authentication module 206c to authenticate the generic communication data. The generic communication data comprises at least one the: one or more unique digital identities, historic communication data, metadata related to communication sessions, cryptographic signatures, and the like. If the one or more unique digital identities is authenticated successfully by the first entity and the one or more second entities, the communication proceeds securely. However, if there is any discrepancy or inconsistency in the authentication process, the communication may be flagged for further investigation or halted to prevent unauthorized access or data breaches. This verification process ensures that only trusted entities with valid digital identities may engage in communication within the decentralized network, maintaining the integrity and security of the communication ecosystem established by the system 102.

Similarly, the system 102 enables the at least two entities 116 to check the historic communication data. This allows the at least two entities 116 to review past interactions and ensure continuity, accuracy, and context in ongoing communications. By accessing the historic communication data, the at least two entities 116 are able to enhance their understanding of the conversation, retrieve relevant information, and maintain coherence in their interactions. This feature promotes efficient communication within the decentralized network, fostering collaboration and knowledge sharing among the at least two entities 116.

In the metadata related to communication sessions, the at least two entities 116 retrieve communication sessions, such as, but not limited to, timestamps, session duration, and session identifiers, to enhance the management and tracking of communication activities. Timestamps provide a chronological record of communication events, aiding in organizing and referencing past interactions. Session duration information offers insights into the duration of engagements, facilitating efficient resource allocation and scheduling. Session identifiers uniquely identify each communication session, enabling the at least two entities 116 to distinguish between different interactions and manage them effectively. Additionally, cryptographic signatures are utilized to ensure data integrity and authenticity, preventing unauthorized tampering or alteration of the exchanged data. By applying cryptographic signatures to communication data, the at least two entities 116 may verify the origin and integrity of messages, mitigating the risk of data manipulation or forgery. This security measure enhances trust and reliability within the decentralized network, fostering a secure environment for communication and data exchange.

In an exemplary embodiment, the generative AI environment refers to a computational setup where artificial intelligence (AI) approaches are capable of generating new content, responses, or outputs that mimic human-like behavior or creativity. In this generative AI environment, AI models are trained to understand and produce content such as text, images, audio, or other forms of data. The generative AI encompasses various techniques and processes, including, but not limited to, machine learning, deep learning, and natural language processing (NLP). These AI models are trained on large datasets to learn patterns and structures within the data, allowing them to generate unique outputs that are similar to the input data. In the illustrative embodiment, the generative AI environment is configured with AI models that analyze communication patterns, generate responses, and optimize communication strategies. For instance, in chatbots or virtual assistants, generative AI models is able to interpret user queries, generate appropriate responses, and continuously improve their performance based on feedback and interaction history.

In an exemplary embodiment, the generative AI environment comprises at least one of a: machine learning module 216, and natural language processing module 218. The machine learning module 216 is configured with one or more large language models (LLMs) to analyze communication patterns and optimize the communication strategies based on the historic communication data. By leveraging advanced machine learning algorithms and the one or more LLMs, the system 102 is able to identify patterns, trends, and preferences in decentralized communication, allowing for the refinement of communication strategies over time. This adaptive approach enhances the effectiveness and efficiency of decentralized communication between the at least two entities 116.

On the other hand, the natural language processing module 218 is configured to process and generate anthropomorphic responses during the decentralized communication. The natural language processing module 218 is configured to understand natural language inputs from the at the at least two entities 116 and generate human-like responses. By employing sophisticated AI models and linguistic analysis techniques, the system 102 is able to interpret the intent and context of messages, enabling it to generate relevant and contextually appropriate responses. This capability enhances the naturalness and fluency of communication, fostering more engaging and effective interactions between the at least two entities 116.

In an exemplary embodiment, the entity selection subsystem 212 is configured to select the one or more second entities within the at least two entities 116. The selection process is based on the one or more bidirectional communication between the first entity and the one or more second entities in the generative AI environment for the one or more tasks. To enhance the efficiency and effectiveness of entity selection, the entity selection subsystem 212 is configured with a relevance assessment module 220. The relevance assessment module 220 is configured to evaluate the relevance of the potential one or more second entities by assigning them a relevance score based on one or more predetermined conditions. The one or more predetermined conditions comprises, but not limited to, at least one of: proximity, compatibility, availability, historic communications data, and the like. The relevance score is a quantitative measure used to assess the degree of relevance or suitability of something to a particular context, task, and query. In the context of entity selection within the system 102, The relevance score indicates how well the one or more second entities matches the criteria or conditions specified for selection. The relevance score is often calculated based on various factors such as, but not limited to, reviews, ratings, trustworthiness, performance metrics, contextual relevance, proximity, compatibility, availability, and historical communication data. Higher relevance scores indicate a stronger match, making the entity more suitable for the given task or interaction.

The proximity refers to the physical or virtual closeness of the one or more second entities to the first entity. The compatibility assesses the suitability of the one or more second entities based on factors such as capabilities, preferences, and goals. The availability indicates the readiness and accessibility of the one or more second entities for engagement in the intended tasks. The historical communication data encompasses past interactions or engagements between the first entity and the one or more second entities, providing insights into their past performance or reliability. By considering these predetermined conditions and assessing the relevance of the potential one or more second entities, the entity selection subsystem 212 facilitates efficient and informed decision-making in selecting the one or more second entities for collaboration or interaction within the generative AI environment. This process enhances the overall effectiveness and performance of the system 102 by ensuring that interactions are meaningful, productive, and aligned with the objectives of the tasks at hand.

The one or more tasks refers to at least one of: activities, objectives, and functions that the at least two entities 116 within the system 102 aim to accomplish through their interactions within the generative AI environment. The one or more tasks may encompass a wide range of activities or goals that require collaboration, communication, and coordinated efforts between the at least two entities 116. For instance, the one or more tasks may comprises at least one of: vehicle parking, food picking, toll fee payment, Package delivery, and the like.

In an exemplary embodiment, the second data-exchange subsystem 214 is configured to exchange the domain-specific communication data between the first entity and the one or more second entities. In the illustrative embodiment, the first entity is configured with the one or more second unique digital identities. The one or more second unique digital identities comprises the domain-specific communication data to exchange with the one or more second entities through the second data-exchange subsystem 214. The domain-specific communication data is used for performing the one or more tasks by providing the decentralized communication between the at least two entities 116. The first data-exchange subsystem 210 and the second data-exchange subsystem 214 comprises a data encoding module 222 and a data decoding module 224. The data encoding module 222 is configured to encode the generic communication data and the domain-specific communication data based on standardized protocols. The standardized protocols comprise at least one of: Hypertext Transfer Protocol (HTTP), Transmission Control Protocol (TCP), Internet Protocol (IP), JavaScript Object Notation (JSON), and Extensible Markup Language (XML). The data decoding module 224 is configured to decode the generic communication data and the domain-specific communication data during the decentralized communication between the at least two entities 116.

In an exemplary embodiment, each of the first data-exchange subsystem 210 and the second data-exchange subsystem 214 are configured to connect with an interaction plane subsystem 226. The interaction plane subsystem 226 is configured to manage the decentralized communication between the at least two entities 116 through one of a: virtual interaction platform and physical interaction platform. The virtual interaction platform is configured to exchange the generic communication data and the domain-specific communication data in digital environments. The digital environments include, but not limited to, one of: websites, applications, messaging platforms, and the like. On the other hand, the physical interaction platform is configured to exchange the generic communication data and the domain-specific communication data in a real world. The real world includes, but not limited to, one of: locations in physical space and proximity-based interactions. The domain-specific communication data comprises, but not limited to, at least one of: financial transaction data, instructions associated with an autonomous transaction execution, session management data, time tracking data, namespace management data, subscription management data, logging data, reporting data, analytics data, electronic commerce management data, bot queuing data, and the like.

In an exemplary embodiment, the decentralized communication between the at least two entities 116 encompasses various modes, including, but not limited to, bot-to-bot communication, human-to-bot communication, autonomous engine-to-bot communication, autonomous engine-to-autonomous engine communication, and autonomous engine-to-human communication. These modes cater to different scenarios and interactions within the decentralized network, ensuring flexibility and adaptability to diverse communication needs and contexts.

Figure 3:
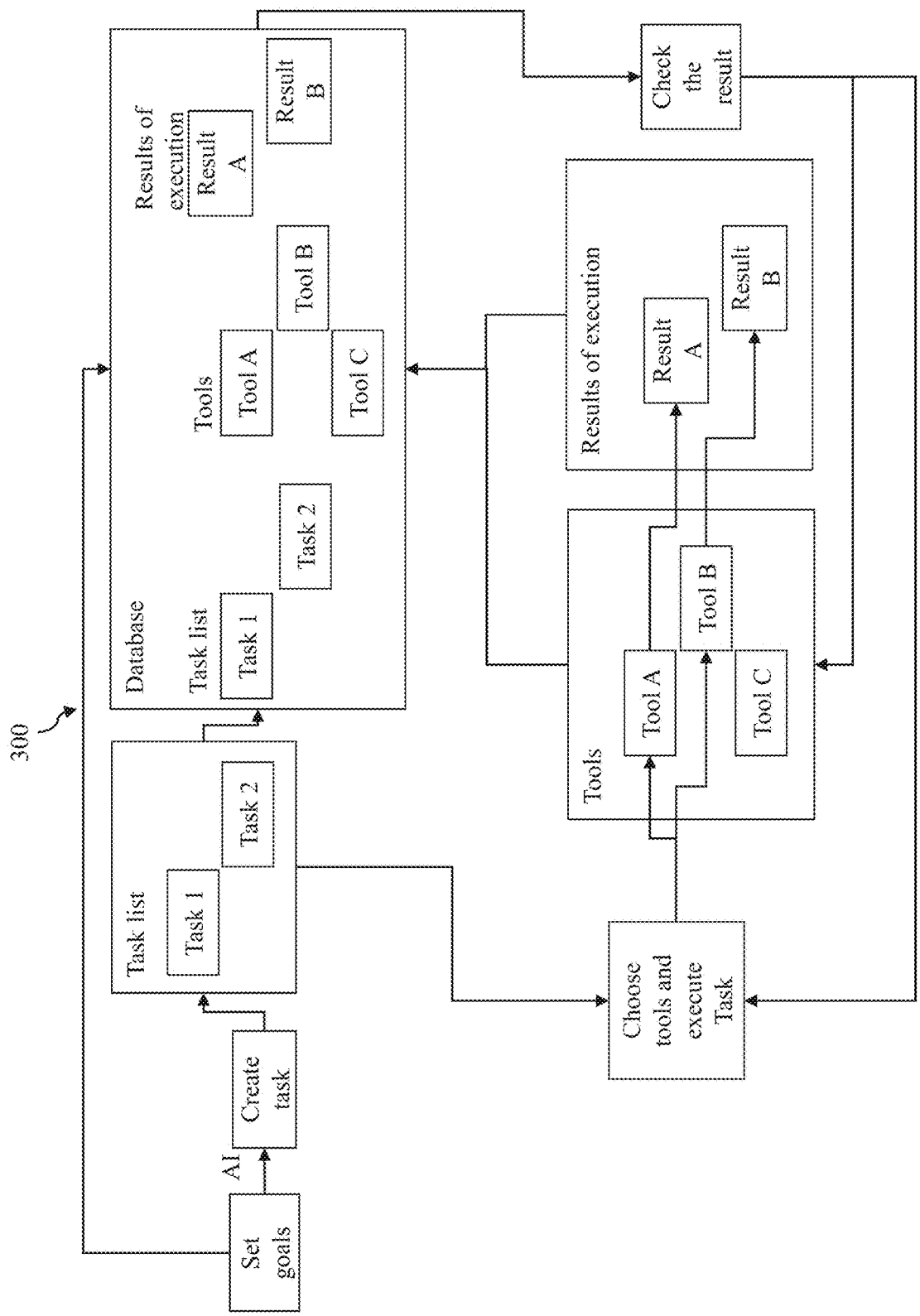
FIG. 3 illustrates an exemplary flowchart depicting an execution of one or more tasks by the at least two entities within the decentralized network, in accordance with an embodiment of the present disclosure.

FIG. 3 illustrates an exemplary flowchart 300 depicting an execution of one or more tasks by the at least two entities 116 within the decentralized network, in accordance with an embodiment of the present disclosure.

In an exemplary embodiment, the first entity is configured with a goal for communication with the one or more second entities for executing the one or more tasks. For executing the one or more tasks the first entity obtains the inputs from at least one of the: data source, and human and the like to decide the task to be executed first. The data source may comprise at least one of: indexers, OLTP, No SQL, RDBMS, and the like. Based on the decision of the first entity about the execution of one of: Task 1 and Task 2, the first entity is configured to detect the one or more second entities associated with the at least two entities within the pre-defined distance in the decentralized network by employing the communication network 108, based on the one or more unique digital identities. The first entity autonomously decides to do Task 1 or Task 2 based on the one or more predetermined conditions comprises at least one of the: proximity, compatibility, availability, and historic communications data. The first entity exchanges the generic communication data with the one or more second entities based on the one or more tasks to be executed first. The first entity select the one or more second entities based on the one or more bidirectional communication between the first entity and the one or more second entities in the generative artificial intelligence (AI) environment for executing the one or more tasks. Finally, based on the task to be executed the first entity is configured to exchange domain-specific communication data with the one or more second entity to execute the one or more tasks.

For example, if the initial entity is an autonomous vehicle, Task 1 might involve picking up a person, while Task 2 might entail retrieving food from a vending machine. In this case the one or more second entities may be the person and the vending machine. In such a scenario, the autonomous vehicle utilizes inputs from sources like data sources or humans to determine the order of the tasks. Alternatively, the autonomous vehicle independently decides by communicating with both the person and the vending machine, exchanging generic communication data with the first unique digital identity to make the decision. This generic communication data informs the autonomous vehicle whether to prioritize picking up the person or fetching the food. Based on the priority, the autonomous vehicle reaches the desired destination and exchanges the domain-specific communication data with the one or more second unique digital identities to execute the Task 1 or Task 2. In another scenario, if the autonomous vehicle needs to pass by the vending machine location to pick up the person, it gives priority to Task 2, fetching the food, before proceeding with Task 1, picking up the person. This decision is autonomously made based on the exchange of generic communication data between the autonomous vehicle (the first entity) and the person and vending machine (the one or more second entities).

Figure 4A:
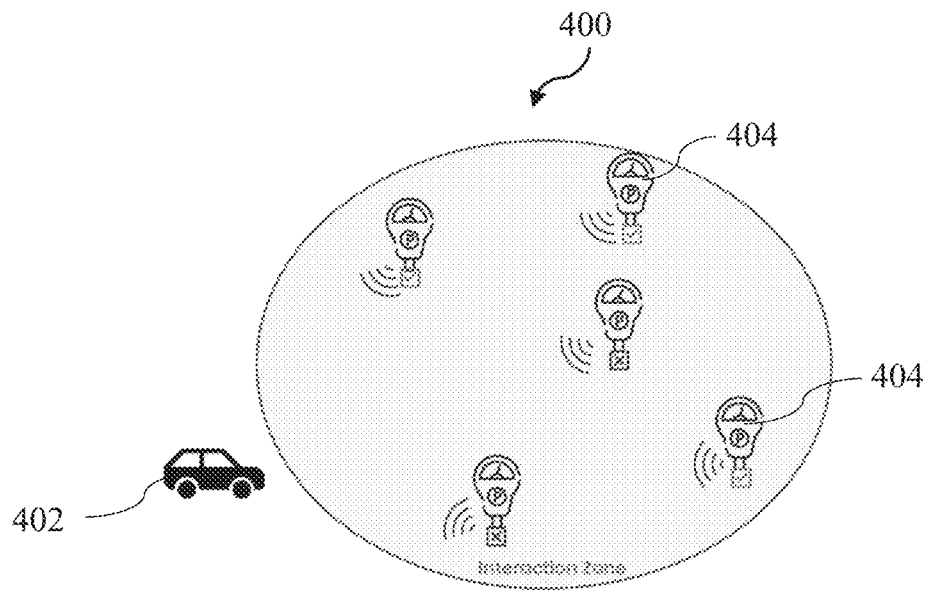
FIGS. 4A and 4B illustrate exemplary schematic views of the autonomous vehicle and one or more parking meters in a decentralized network for performing the one or more tasks with the decentralized communication, in accordance with an embodiment of the present disclosure.
Figure 4B:
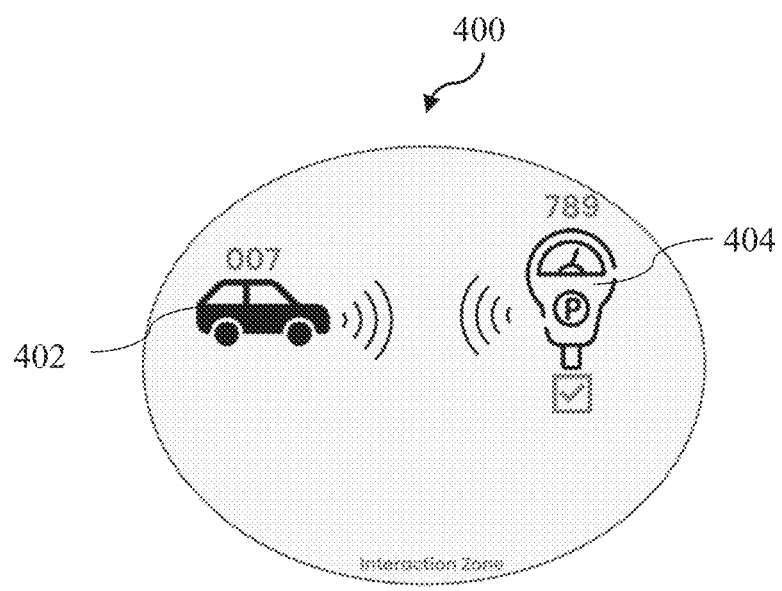

FIGS. 4A and 4B illustrate exemplary schematic views 400 of the autonomous vehicle 402 and one or more parking meters 404 in a decentralized network for performing the one or more tasks with the decentralized communication, in accordance with an embodiment of the present disclosure.

In an exemplary embodiment, the autonomous vehicle 402 is registered with the first unique digital identity and the second unique digital identity. Each parking meter 404 of the one or more parking meters 404 is registered with a third unique digital identity. The autonomous vehicle 402 is configured with the system 102 to communicate with the one or more parking meters 404, which are also configured with the system 102 within the decentralized network. In the first step, the autonomous vehicle 402 is configured to detect the one or more parking meters 404 within the pre-defined distance registered within the decentralized network by employing the communication network 108, based on the third unique digital identity.

In the next step, the autonomous vehicle 402 is configured to transfer the generic communication data with the first unique digital identity to one or more parking meters 404. For instance, the autonomous vehicle 402 is configured to share at least one of the: first unique digital identities, GPS coordinates, and the like with the one or more parking meters 404 by using the first unique digital identity. On the other hand, the one or more parking meters 404 is configured to share at least one of the: third unique digital identity, GPS coordinates associated with each parking meter 404 of the one or more parking meters 404, and the like with the autonomous vehicle 402.

In the next step, the autonomous vehicle 402 is configured to select one parking meter 404 from the one or more parking meters 404 based on the relevance score and the one or more predetermined conditions. The relevance score may be determined based on the availability of the one or more parking meters 404, cost of the one or more parking meters 404, and the distance from the autonomous vehicle 402 to the one or more parking meters 404. Upon selecting the parking meter 404, the autonomous vehicle 402 reaches the selected parking meter 404 and is configured to exchange the domain-specific communication data by using the second unique digital identity and receive the third unique digital identity from the selected parking meter 404 after authenticating each other. The domain-specific communication data may comprise at least one of the: financial transaction data, session management data, time tracking data, and the like. In the illustrative embodiment, the autonomous vehicle 402 and the selected parking meter 404 may communicate with each other on the virtual interaction platform (e.g., a mobile app or web interface). The autonomous vehicle 402 autonomously makes reservations and completes payment transactions to perform the parking task associated with the one or more tasks with the decentralized communication.

In another exemplary embodiment, the one or more parking meters 404 may be replaced with one of a: toll booth, food drive-thru, and the like. In these scenarios, the autonomous vehicle 402 is configured to communicate with the toll booth via BLE automatically and execute the financial transaction. In another scenario, the autonomous vehicle 402 is configured to communicate with the food drive-thru via BLE, order food online, and collect the food.

Figure 5A:
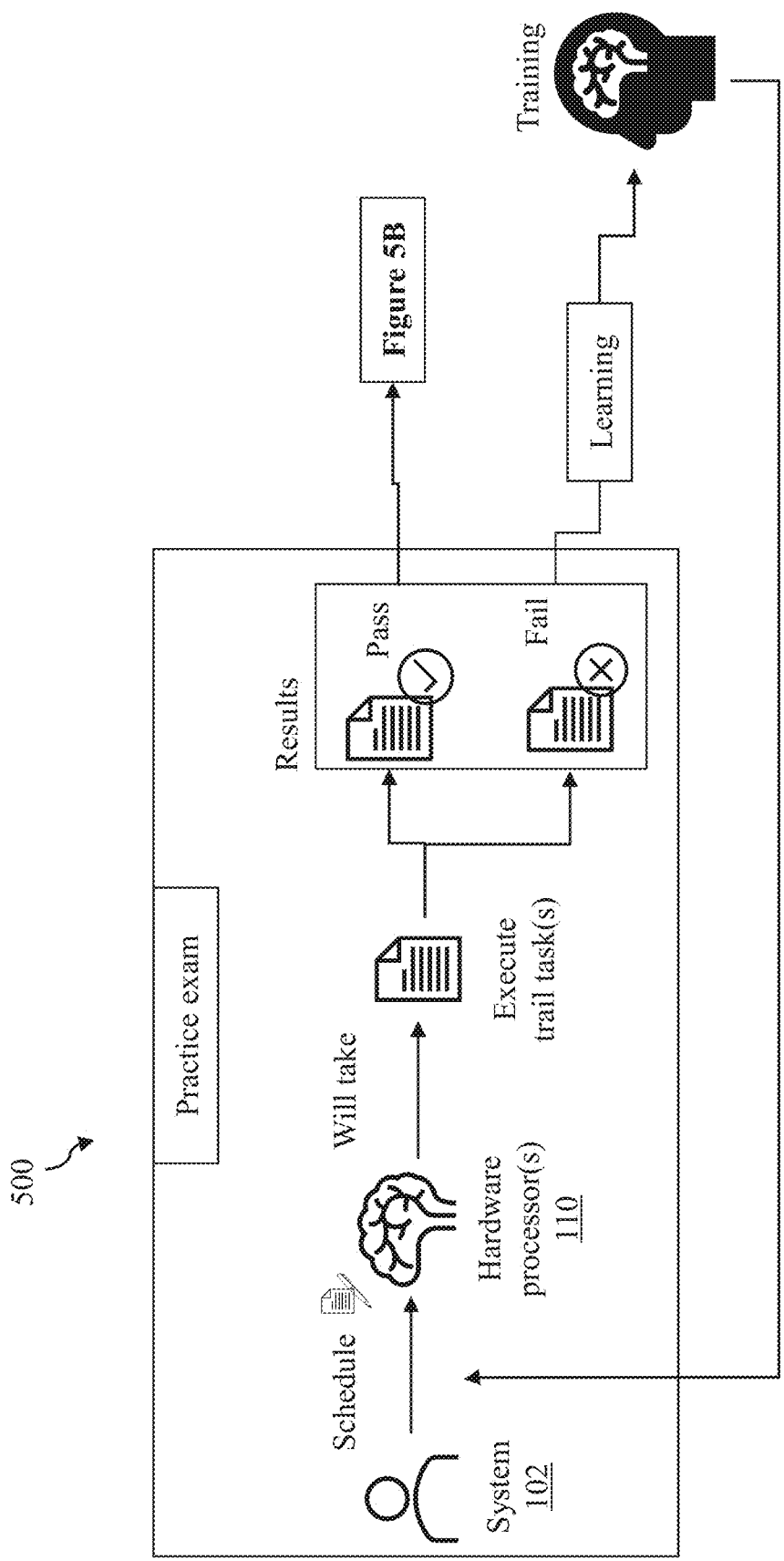
FIGS. 5A and 5B illustrate exemplary schematic views depicting training of the computer-implemented system for performing the one or more tasks with the decentralized communication, in accordance with an embodiment of the present disclosure.
Figure 5B:
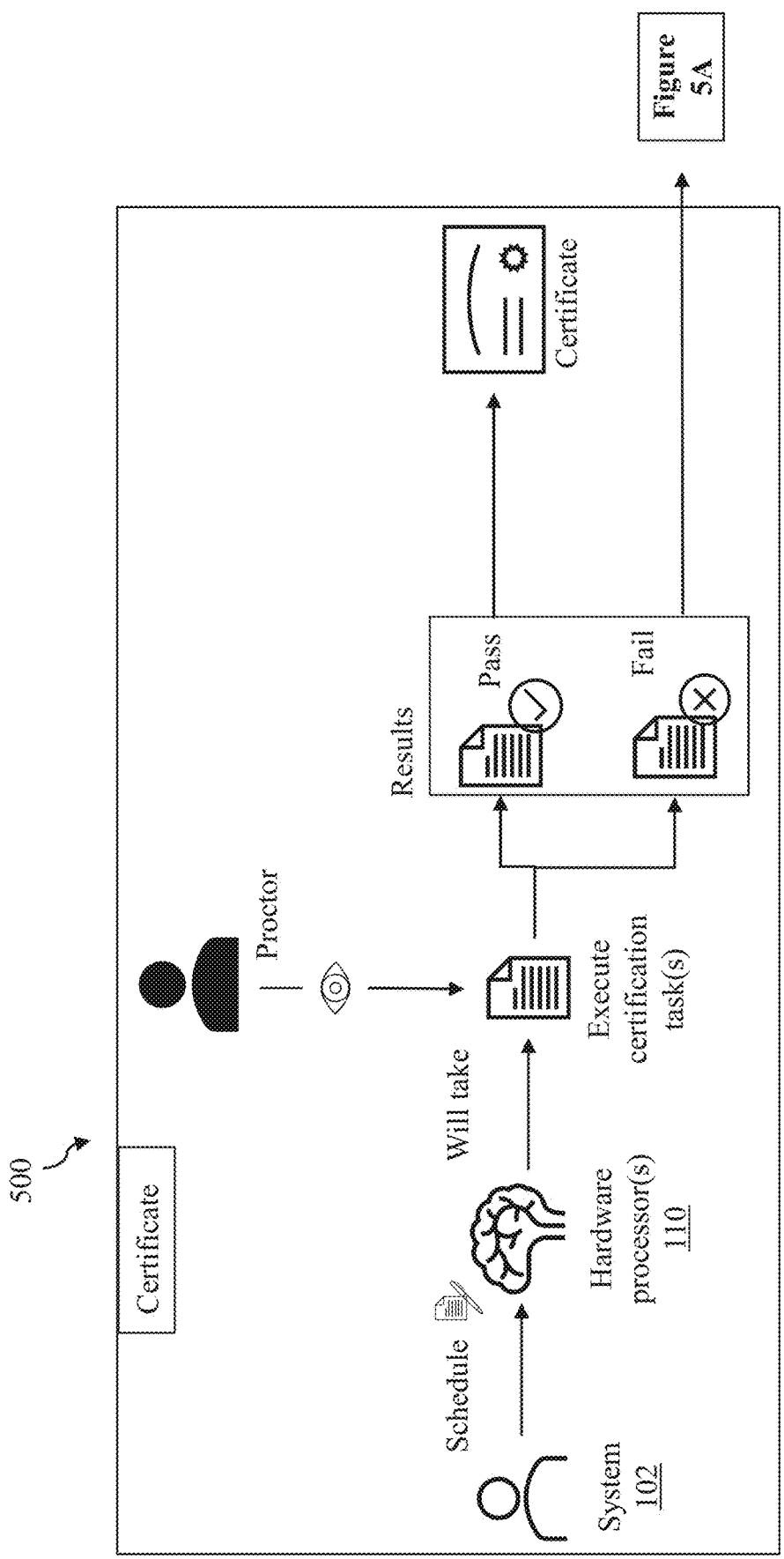

FIGS. 5A and 5B illustrate exemplary schematic views depicting training 500 of the system 102 for performing the one or more tasks with the decentralized communication, in accordance with an embodiment of the present disclosure.

In an exemplary embodiment, the system 102 is scheduled to perform one or more mock tasks encompassing diverse question formats. In the next step, the system 102 adheres to the schedule, the one or more hardware processors 110 execute the one or more mock tasks to generate one or more responses as output of the one or more hardware processors 110. In the next step, the one or more responses are evaluated with a pre-defined one or more responses. In the next step, based on the evaluation of the one or more mock tasks are assigned with a training score for assess overall accuracy of a mock training. In the next step, if the training score is above 90 percent refer to pass and proceed to certification training. In case the training score is below 90 percent refers to failure and prompts a repetition from the beginning.

Once the training score is above 90 percent, the system 102 is allowed to take the certification training. In the certification training, the system 102 schedules one or more real-time tasks. The one or more hardware processors 110 execute the one or more real-time tasks to generate one or more responses as output. While executing the one or more real-time tasks a proctor monitors the system 102. Further, the proctor compares the one or more responses associated with the one or more real-time tasks with the pre-defined one or more real-time responses. In the next step, the certification score is assigned to the one or more real-time tasks. If the certification score is above 90 percent refer to pass and proceed to certification for real-world interaction. If the certification score is below 90 percent prompt the system 102 to the repetition from the beginning as depicted in FIG. 5A.

Figure 6A:
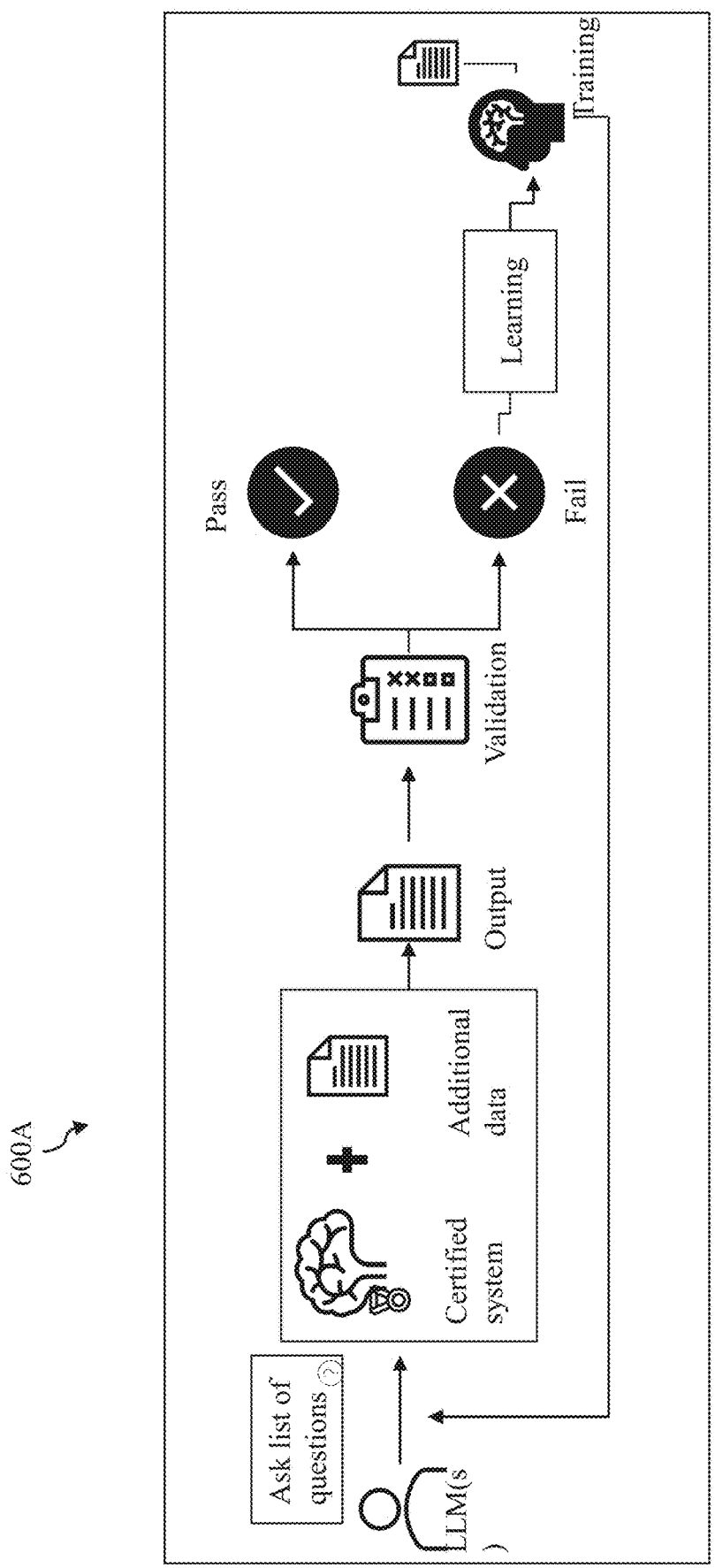
FIG. 6A illustrates an exemplary schematic view depicting pre-launch training for a machine learning module, in accordance with an embodiment of the present disclosure.

FIG. 6A illustrates an exemplary schematic view depicting pre-launch training 600A for the machine learning module 216, in accordance with an embodiment of the present disclosure.

In an exemplary embodiment, the one or more LLMs undergo a learning process by analyzing a corpus of data from the data sources. In the next step, the system 102 is configured to pose a plurality of queries in different formats to the one or more LLMs. The one or more LLMs is configured to generate a response for each query of the plurality of queries. The generated responses are evaluated by comparing them with the pre-defined responses for assigning a pre-launch training score. In the next step, if the pre-launch training score is above 90 percent refer to pass. In case the pre-launch training score is below 90 percent refers to failure and prompts a repetition from the beginning.

Figure 6B:
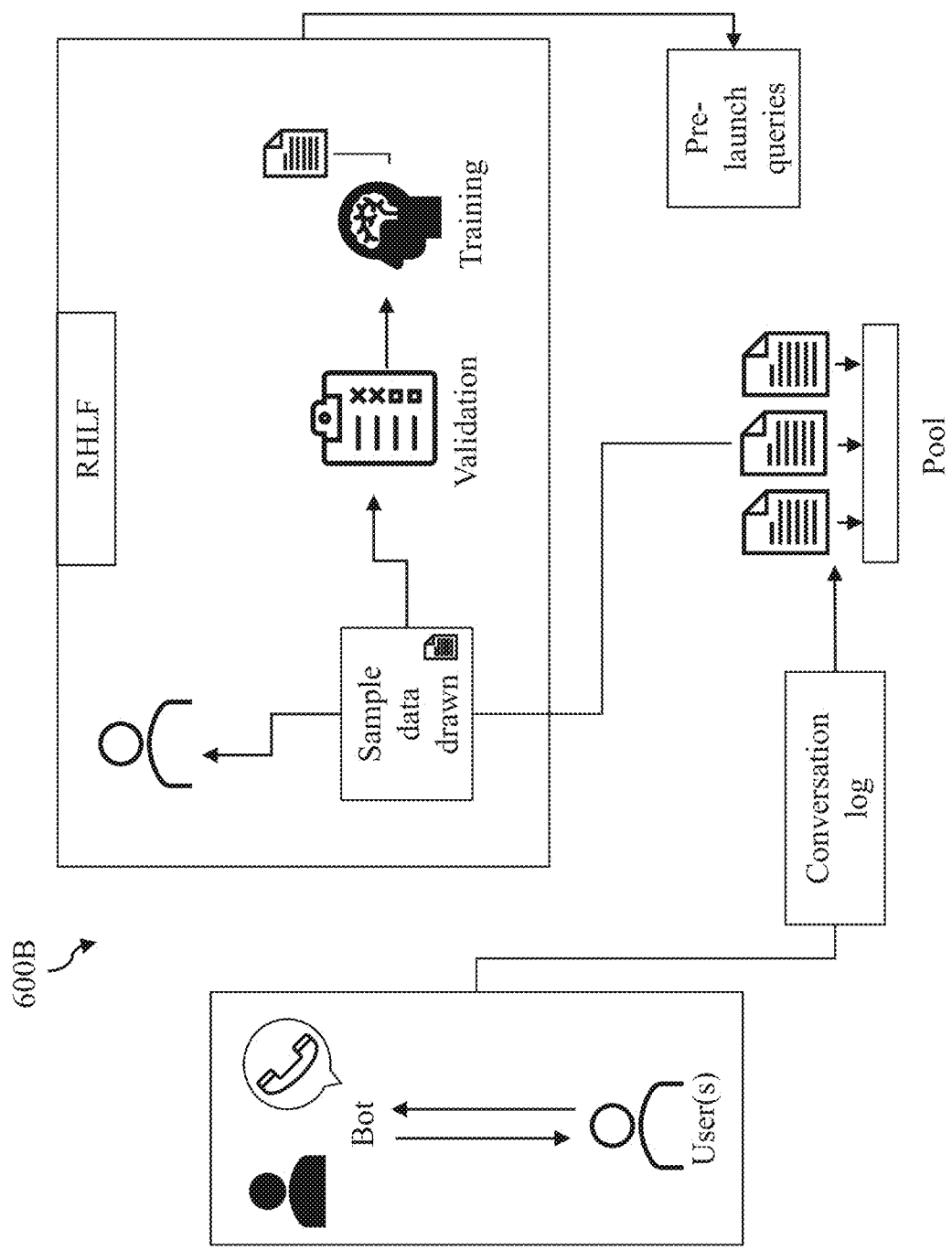
FIG. 6B illustrates an exemplary schematic view depicting post-launch training for the machine learning module, in accordance with an embodiment of the present disclosure.

FIG. 6B illustrates an exemplary schematic view depicting post-launch training 600B for the machine learning module 216, in accordance with an embodiment of the present disclosure.

In an exemplary embodiment, the machine learning module 216 is configured with a plurality of live queries. For the plurality of live queries, the machine learning module 216 generates the live responses by using the one or more LLMs. The generated live responses are transferred to one or more users for human confirmation. If the live response is okay, mark it as a pass and proceed to the next step. If the answer is not satisfactory, mark it as a failure. In case of failure, the one or more users provide a correct live response. Further, the correct live response is fed to the one or more LLMs for retraining as part of Reinforcement Learning Human Feedback (RLHF).

Figure 7:
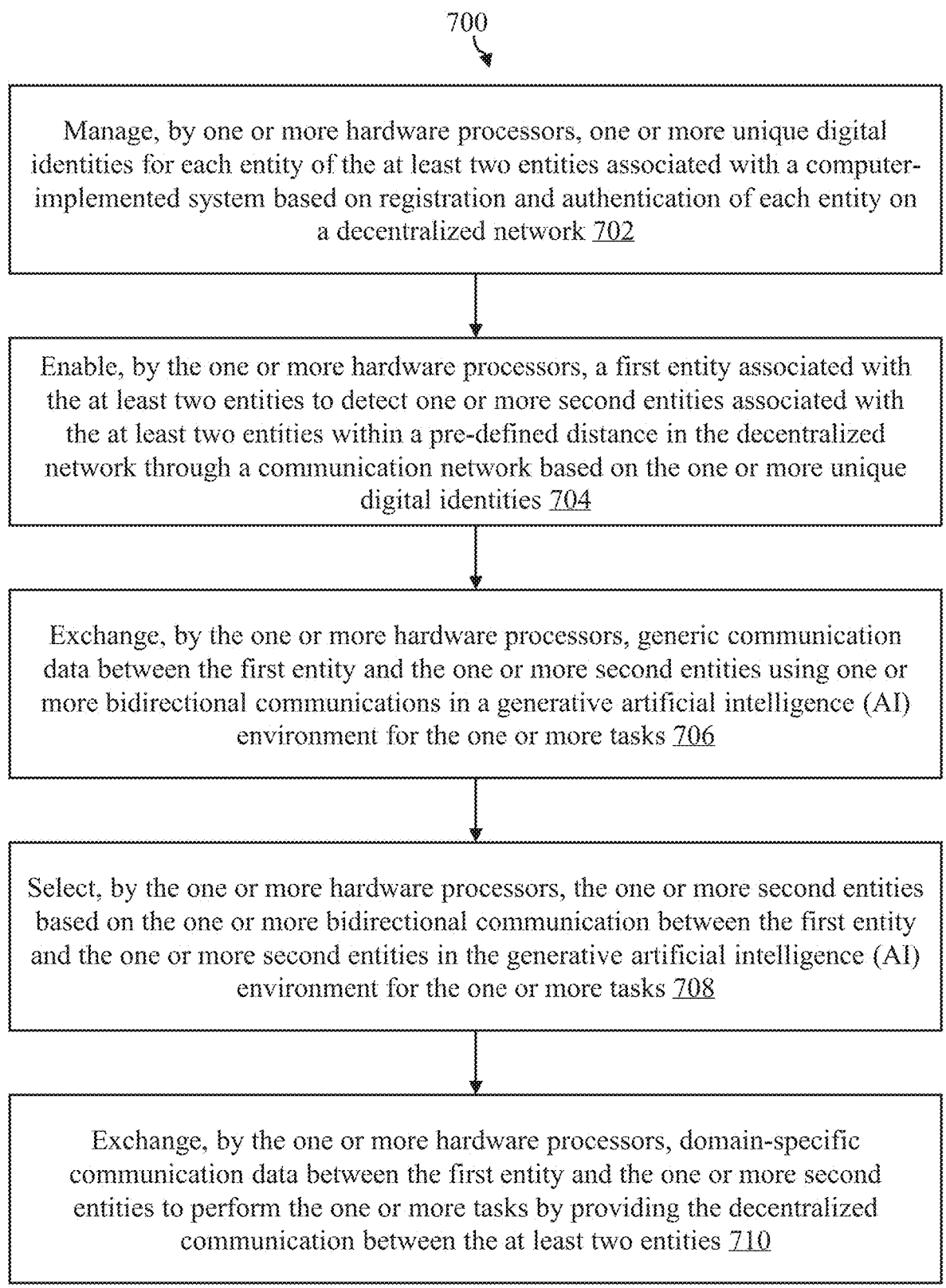
FIG. 7 illustrates an exemplary flowchart of a computer-implemented method for performing the one or more tasks by providing the decentralized communication between the at least two entities, in accordance with an embodiment of the present disclosure.

FIG. 7 illustrates an exemplary flowchart of a computer-implemented method 700 for performing the one or more tasks by providing the decentralized communication between the at least two entities, in accordance with an embodiment of the present disclosure.

In an exemplary embodiment, at step 702, the computer-implemented method 700 involves managing, by the one or more hardware processors, the one or more unique digital identities for each entity of the at least two entities associated with the system. The one or more unique digital identities is generated for each entity by the one or more NFTs based on mnemonic identifiers. The generated one or more NFTs is registered onto the decentralized network. Further, the registered one or more NFTs of each entity during the communication is authenticated. The NFT of each entity is defined with a plurality of rules, syntax, and semantics for communication. The NFT defines communication protocol, including message formats and data encoding. This implements the protocol in software, firmware, and hardware. The system is configured to manage errors and ensures reliable communication between the at least two entities.

At step 704, the computer-implemented method 700 involves enabling, by the one or more hardware processors, the first entity associated with the at least two entities to detect the one or more second entities associated with the at least two entities within the pre-defined distance in the decentralized network through the communication network based on the one or more unique digital identities. The detection is implemented by various methods such as, but not limited to, broadcasting, multicasting, service discovery protocols, beaconing, transmission control protocol (TCP), directory access services, probing, polling, peer-to-peer networking, entity-based detection, and application programming interface (API)-based detection. In another exemplary embodiment, the at least two entities may use one or more sensors for detection of the one or more second entities.

At step 706, the computer-implemented method 700 involves exchanging, by the one or more hardware processors, the generic communication data between the first entity and the one or more second entities using the one or more bidirectional communications in the generative AI environment for performing the one or more tasks. The bidirectional communications may be held on at least one of the: virtual interaction platform and physical interaction platform. The generic communication data comprises at least one the: one or more unique digital identities, historic communication data, metadata related to communication sessions, and cryptographic signatures.

At step 708, the computer-implemented method 700 involves selecting, by the one or more hardware processors, the one or more second entities based on the one or more bidirectional communication between the first entity and the one or more second entities in the generative AI environment for the one or more tasks. The selection process is based on the relevance score of the one or more second entities based on one or more predetermined conditions. The one or more predetermined conditions comprises at least one of the: proximity, compatibility, availability, and historic communications data.

At step 710, the computer-implemented method 700 involves the one or more hardware processors facilitating the exchange of domain-specific communication data between the first entity and the one or more second entities, enabling the execution of the one or more tasks and decentralized communication among the at least two entities. This domain-specific communication data encompasses a variety of information crucial for task execution and system operation. Such domain-specific communication data may include financial transaction details, instructions pertinent to autonomous transaction execution, session management information, time tracking records, namespace management data, subscription management details, logging information, reporting metrics, analytics data, electronic commerce management records, and data related to bot queuing operations. The exchange of this diverse set of domain-specific communication data supports seamless communication and efficient task performance within the decentralized network.

Figure 8:
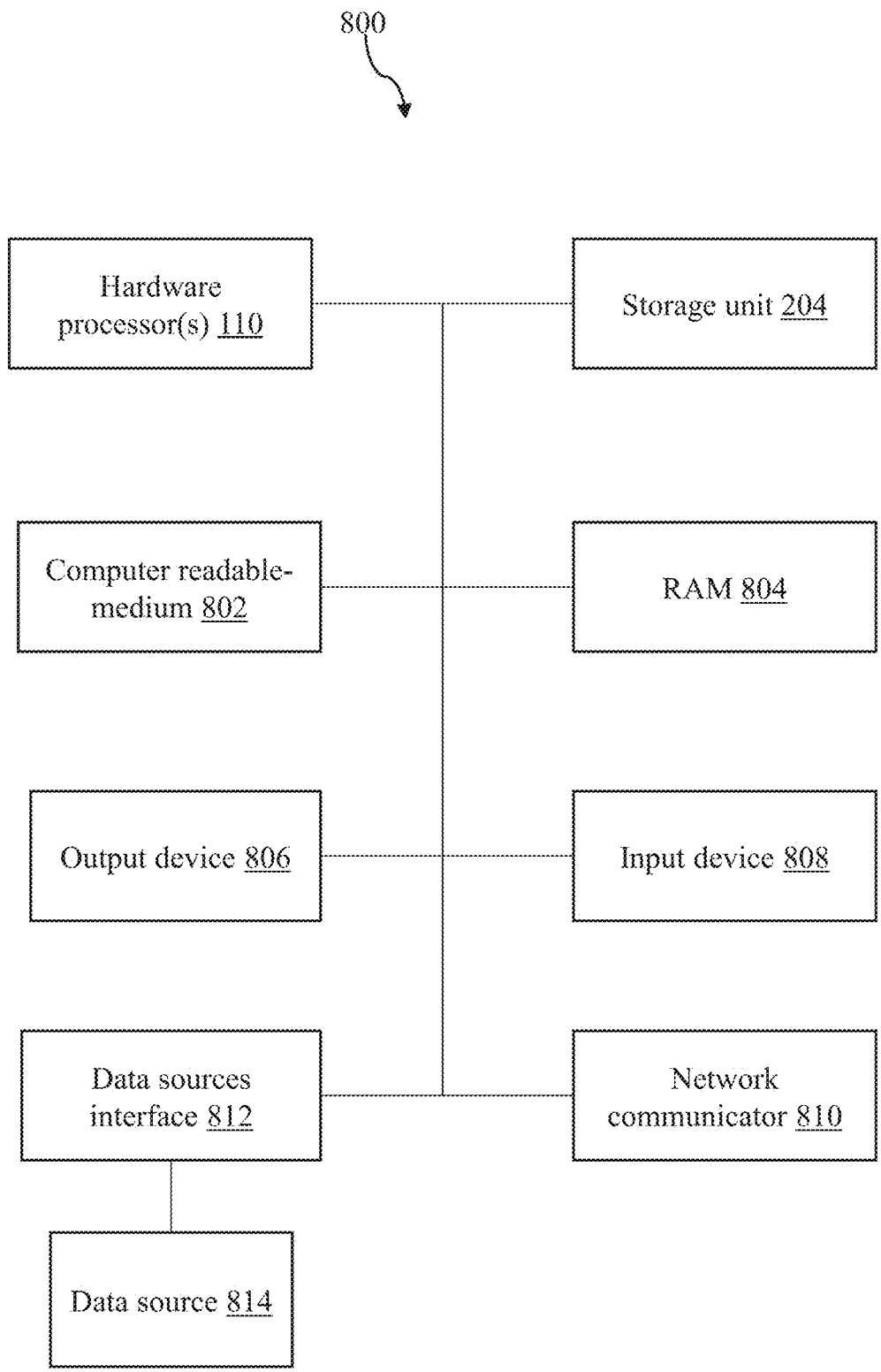
FIG. 8 illustrates an exemplary block diagram representation of a hardware platform for implementation of the disclosed system, according to an example embodiment of the present disclosure.

FIG. 8 illustrates an exemplary block diagram representation of a hardware platform 800 for implementation of the disclosed system 102, according to an example embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the hardware platform 800. As illustrated, the hardware platform 800 may include additional components not shown, and some of the components described may be removed and/or modified. For example, a computer system with multiple GPUs may be located on at least one of: internal printed circuit boards (PCBs) and external-cloud platforms including Amazon Web Services, internal corporate cloud computing clusters, or organizational computing resources.

The hardware platform 800 may be a computer system such as the system 102 that may be used with the embodiments described herein. The computer system may represent a computational platform that includes components that may be in a server or another computer system. The computer system may be executed by the one or more hardware processors 110 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 110 that executes software instructions or code stored on a non-transitory computer-readable storage medium 802 to perform methods of the present disclosure. The software code includes, for example, instructions to gather data and analyze the data. For example, the plurality of subsystems 114 includes the identity managing subsystem 206, the entity detection subsystem 208, the first data-exchange subsystem 210, the entity selection subsystem 212, and the second data-exchange subsystem 214.

The instructions on the computer-readable storage medium 802 are read and stored the instructions in the storage unit 204 or random-access memory (RAM) 804. The storage unit 204 may provide a space for keeping static data where at least some instructions could be stored for later execution. The stored instructions may be further compiled to generate other representations of the instructions and dynamically stored in the RAM 804 such as RAM 804. The one or more hardware processors 110 may read instructions from the RAM 804 and perform actions as instructed.

The computer system may further include the output device 806 to provide at least some of the results of the execution as output including, but not limited to, visual information to users, such as external agents. The output device 806 may include a display on computing devices and virtual reality glasses. For example, the display may be a mobile phone screen or a laptop screen. GUIs and/or text may be presented as an output on the display screen. The computer system may further include an input device 808 to provide a user or another device with mechanisms for entering data and/or otherwise interacting with the computer system. The input device 808 may include, for example, a keyboard, a keypad, a mouse, or a touchscreen. Each of these output devices 806 and input device 808 may be joined by one or more additional peripherals. For example, the output device 806 may be used to establish the bidirectional communication between the at least two entities.

A network communicator 810 may be provided to connect the computer system to a network and in turn to other devices connected to the network including other entities, servers, data stores, and interfaces, for example. A network communicator 810 may include, for example, a network module such as a Long-Term Evolution (LTE) module or any other wireless module. The computer system may include a data sources interface 812 to access the data source 814. The data source 814 may be an information resource. As an example, a database of exceptions and rules may be provided as the data source 814. Moreover, knowledge repositories and curated data may be other examples of the data source 814. In the LTE module, Quectel EC25 is a series of LTE Cat 4 module optimized specially for M2M and Internet of Things (IoT) applications. Adopting the 3GPP Rel. 11 LTE technology, it delivers maximum data rates up to 150 Mbps downlink and 50 Mbps uplink. EC25 series contains 12 variants: EC25-E, EC25-EU, EC25-EUX, EC25-J, EC25-A, EC25-V, EC25-AF, EC25-AFX, EC25-AFXD (Data-only), EC25-MX, EC25-AU and EC25-AUX. This makes it backward-compatible with existing EDGE and GSM/GPRS networks, ensuring that it can be connected even in remote areas devoid of 4G or 3G coverage. A rich set of Internet protocols, industry-standard interfaces and abundant functionalities (USB serial drivers for Windows 7/8/8.1/10, Linux, Android) extend the applicability of the LTE module to a wide range of M2M and IoT applications such as industrial router, industrial PDA, rugged tablet PC, video surveillance, and digital signage.

Numerous advantages of the present disclosure may be apparent from the discussion above. In accordance with the present disclosure, the system facilitates decentralized communication among multiple entities, fostering seamless interaction without reliance on centralized infrastructure. This decentralized approach enhances data security and resilience by minimizing single points of failure. Additionally, the use of unique digital identities and robust authentication mechanisms ensures the integrity and authenticity of communication channels, mitigating risks associated with impersonation and unauthorized access. Moreover, the system's ability to exchange both generic and domain-specific communication data enables efficient task execution and supports a wide range of applications, from financial transactions to autonomous operations. Furthermore, the integration of generative AI technologies enhances communication by enabling natural language processing and optimizing strategies based on historical data. Overall, the present disclosure offers a versatile and secure communication framework that can adapt to diverse scenarios and requirements, paving the way for enhanced efficiency, reliability, and innovation in various domains.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A computer-implemented system for performing one or more tasks by providing a decentralized communication between at least two entities, comprising:
one or more hardware processors;
a memory unit coupled to the one or more hardware processors, wherein the memory unit comprises a plurality of subsystems in form of programmable instructions executable by the one or more hardware processors, wherein the plurality of subsystems comprises:
an identity managing subsystem configured to manage one or more unique digital identities for each entity of the at least two entities communicating with the computer-implemented system based on registration and authentication of each entity on a decentralized network, wherein the identity managing subsystem further comprises:
an identity generation module configured to generate one or more non-fungible tokens (NFTs) as the one or more unique digital identities for each entity of the at least two entities, based on mnemonic identifiers, the mnemonic identifiers obtained through at least one of a: participative social Web (Web2) name registrar and read, write, execute Web (Web3) name registrar;
an identity registration module configured to register the generated one or more non-fungible tokens (NFTs) onto the decentralized network, assigning each entity a unique identifier within the decentralized network,
the decentralized network comprises at least one of: Ethereum, Binance Smart Chain (BSC), Flow, Tezos, and Polygon; and
an identity authentication module configured to authenticate the registered one or more non-fungible tokens (NFTs) of each entity during the communication, providing an integrity and security in the decentralized communication;
an entity detection subsystem configured to enable a first entity of the at least two entities to detect one or more second entities of the at least two entities within a pre-defined distance in the decentralized network by employing a communication network, using the one or more unique digital identities;
a first data-exchange subsystem configured to exchange generic communication data between the first entity and the one or more second entities using one or more bidirectional communications in a generative artificial intelligence (AI) environment for the one or more tasks;
an entity selection subsystem configured to select the one or more second entities based on the one or more bidirectional communication between the first entity and the one or more second entities in the generative artificial intelligence (AI) environment for the one or more tasks; and
a second data-exchange subsystem configured to exchange domain-specific communication data between the first entity and the one or more second entities for performing the one or more tasks by providing the decentralized communication between the at least two entities.

2. The computer-implemented system of claim 1, wherein the identity managing subsystem is configured with a financial transaction module,
the financial transaction module configured to transfer digital assets between the at least two entities within the decentralized network based on the domain-specific communication data,
the digital assets comprise at least one of: cryptocurrency, stablecoins, fungible tokens and the one or more non-fungible tokens (NFTs),
the financial transaction module configured to validate and store financial transaction data in a database.

3. The computer-implemented system of claim 1, wherein the detection of the one or more second entities is performed based on at least one of: broadcasting, multicasting, service discovery protocols, beaconing, transmission control protocol (TCP), directory access services, probing, polling, peer-to-peer networking, entity-based detection, and application programming interface (API)-based detection.

4. The computer-implemented system of claim 1, wherein the first entity configured with a first unique digital identity of the one or more unique digital identities,
the first unique digital identity comprises the generic communication data to exchange with the one or more second entities through the first data-exchange subsystem,
the first unique digital identity comprises one or more second unique digital identities,
the one or more second unique digital identities comprises the domain-specific communication data to exchange with the one or more second entities through the second data-exchange subsystem.

5. The computer-implemented system of claim 1, wherein the first data-exchange subsystem is configured to connect with the identity authentication module to authenticate the generic communication data,
the generic communication data comprises at least one the: unique digital identity, historic communication data, metadata related to communication sessions, and cryptographic signatures.

6. The computer-implemented system of claim 1, wherein the generative artificial intelligence (AI) environment comprises at least one of a: machine learning module, and natural language processing module,
the machine learning module configured with one or more large language models (LLMs) to analyze communication patterns and optimize communication strategies based on the historic communication data; and
the natural language processing module configured to process and generate anthropomorphic responses during the decentralized communication between the at least two entities.

7. The computer-implemented system of claim 1, wherein each of the first data-exchange subsystem and the second data-exchange subsystem comprises a data encoding module and a data decoding module,
the data encoding module configured to encode the generic communication data and the domain-specific communication data based on standardized protocols,
the standardized protocols comprise at least one of: Hypertext Transfer Protocol (HTTP), Transmission Control Protocol (TCP), Internet Protocol (IP), JavaScript Object Notation (JSON), and Extensible Markup Language (XML); and
the decoding module configured to decode the generic communication data and the domain-specific communication data during the decentralized communication between the at least two entities.

8. The computer-implemented system of claim 1, wherein each of the first data-exchange subsystem and the second data-exchange subsystem are configured to connect with an interaction plane subsystem,
the interaction plane subsystem is configured to manage the decentralized communication between the at least two entities through one of a: virtual interaction platform and physical interaction platform,
the virtual interaction platform is configured to exchange the generic communication data and the domain-specific communication data in digital environments,
the digital environments includes one of: websites, applications, and messaging platforms; and
the physical interaction platform is configured to exchange the generic communication data and the domain-specific communication data in a real world, the real world including one of: locations in physical space and proximity-based interactions.

9. The computer-implemented system of claim 1, wherein the entity selection subsystem is configured with a relevance assessment module,
the relevance assessment module is configured to assess a relevance score of the one or more second entities based on one or more predetermined conditions,
the one or more predetermined conditions comprises at least one of: proximity, compatibility, availability, and historic communications data.

10. The computer-implemented system of claim 1, wherein the domain-specific communication data comprises at least one of: financial transaction data, instructions associated with an autonomous transaction execution, session management data, time tracking data, namespace management data, subscription management data, logging data, reporting data, analytics data, electronic commerce management data, and bot queuing data.

11. The computer-implemented system of claim 1, wherein the decentralized communication between the at least two entities comprises one of a: bot-to-bot communication, human-to-bot communication, autonomous engine-to-bot communication, autonomous engine-to-autonomous engine communication, and autonomous engine-to-human communication.

12. The computer-implemented system of claim 1, wherein the communication network comprises at least one of a: long-range wireless broadband communication network and short-range communication network;
the long-range wireless broadband communication network comprises at least one of: Long-Term Evolution (LTE), Fifth Generation (5G), Worldwide Interoperability for Microwave Access (WiMAX), Satellite Internet, Fixed Wireless Access (FWA), and High-Altitude Platform Stations (HAPS) for configured to establish the decentralized communication between the at least two entities within the pre-defined distance for exchanging the generic communication data; and
the short-range communication network comprises at least one of: Bluetooth Low Energy (BLE), Wireless Fidelity (Wi-Fi) Direct, Near Field Communication (NFC), Zigbee, Z-Wave, and Thread configured to establish the decentralized communication between the at least two entities upon selecting the one or more second entities for exchanging the domain-specific communication data.

13. A computer-implemented method for performing one or more tasks by providing a decentralized communication between at least two entities, comprising:

managing, by one or more hardware processors, a unique digital identity for each entity of the at least two entities communicating with a computer-implemented system based on registration and authentication of each entity on a decentralized network, wherein the managing of the one or more unique digital identities comprises generating one or more non-fungible tokens (NFTs) as the one or more unique digital identities, registering the generated non-fungible token (NFT) onto the decentralized network, and authenticating the registered non-fungible token (NFT) of each entity of the at least two entities during the decentralized communication;
enabling, by the one or more hardware processors, a first entity of the at least two entities to detect one or more second entities of the at least two entities within a pre-defined distance in the decentralized network through a communication network using the one or more unique digital identities;
exchanging, by the one or more hardware processors, generic communication data between the first entity and the one or more second entities using one or more bidirectional communications in a generative artificial intelligence (AI) environment for the one or more tasks;
selecting, by the one or more hardware processors, the one or more second entities based on the one or more bidirectional communication between the first entity and the one or more second entities in the generative artificial intelligence (AI) environment for the one or more tasks; and
exchanging, by the one or more hardware processors, domain-specific communication data between the first entity and the one or more second entities to perform the one or more tasks by providing the decentralized communication between the at least two entities.

14. The computer-implemented method of claim 13, wherein the generic communication data comprises the one or more unique digital identities, historic communication data, metadata related to communication sessions, and cryptographic signatures.

15. The computer-implemented method of claim 13, wherein the generative artificial intelligence (AI) environment comprises at least one of a: machine learning module and natural language processing module,
the machine learning module configured with one or more large language models (LLMs) to analyze communication patterns and optimize communication strategies based on historic communication data; and
the natural language processing module configured to process and generate anthropomorphic responses during the decentralized communication between the at least two entities.

16. The computer-implemented method of claim 13, wherein the domain-specific communication data comprises at least one of: financial transaction data, instructions associated with an autonomous transaction execution, session management data, time tracking data, namespace management data, subscription management data, logging data, reporting data, analytics data, electronic commerce management data, and bot queuing data.

17. A non-transitory computer-readable storage medium having programmable instructions stored therein, that when executed by one or more hardware processors, cause the one or more hardware processors to:
manage one or more unique digital identities for each entity of at least two entities communicating with a computer-implemented system based on registration and authentication of each entity on a decentralized network, wherein managing of the one or more unique digital identities comprises generating one or more non-fungible tokens (NFTs) as the one or more unique digital identities, registering the generated non-fungible token (NFT) onto the decentralized network, and authenticating the registered non-fungible token (NFT) of each entity of the at least two entities during the decentralized communication;

enable a first entity of the at least two entities to detect one or more second entities of the at least two entities within a pre-defined distance in the decentralized network through a communication network using the one or more unique digital identities;

exchange generic communication data between the first entity and the one or more second entities using one or more bidirectional communications in a generative artificial intelligence (AI) environment for one or more tasks;

select the one or more second entities based on the one or more bidirectional communication between the first entity and the one or more second entities in the generative artificial intelligence (AI) environment for the one or more tasks; and exchange domain-specific communication data between the first entity and the one or more second entities to perform the one or more tasks by providing the decentralized communication between the at least two entities.

18. The non-transitory computer-readable storage medium of claim 17, wherein the communication between the at least two entities is configured with an interaction plane subsystem, the interaction plane subsystem is configured to manage decentralized communication between the at least two entities through one of a: virtual interaction platform and physical interaction platform, the virtual interaction platform is configured to exchange the generic communication data and the domain-specific communication data in digital environments, the digital environments includes one of: websites, applications, or messaging platforms; and the physical interaction platform is configured to exchange the generic communication data and the domain-specific communication data in a real world, the real world includes one of: locations in physical space and proximity-based interactions.

* * * * *